(12) United States Patent
Spindle

(10) Patent No.: US 12,527,556 B2
(45) Date of Patent: Jan. 20, 2026

(54) INSTRUMENT HANDLE FOR USE WITH INSTRUMENT ALIGNMENT FEEDBACK SYSTEM AND METHOD

(71) Applicant: Karlton E. Spindle, Cedar Glen, CA (US)

(72) Inventor: Karlton E. Spindle, Cedar Glen, CA (US)

(73) Assignee: NavJam, LLC, Monrovia, CA (US)

(*) Notice: Subject to any disclaimer, the term of this patent is extended or adjusted under 35 U.S.C. 154(b) by 417 days.

(21) Appl. No.: 17/065,977

(22) Filed: Oct. 8, 2020

(65) Prior Publication Data

US 2021/0100536 A1 Apr. 8, 2021

Related U.S. Application Data

(60) Provisional application No. 62/912,618, filed on Oct. 8, 2019.

(51) Int. Cl.
*A61B 10/02* (2006.01)
*A61B 90/00* (2016.01)

(52) U.S. Cl.
CPC ............ *A61B 10/025* (2013.01); *A61B 90/06* (2016.02); *A61B 2010/0258* (2013.01); *A61B 2090/067* (2016.02); *A61B 2562/0219* (2013.01)

(58) Field of Classification Search
CPC .................. A61B 10/025; A61B 90/06; A61B 2010/0258; A61B 2090/067; A61B 2562/0219; A61B 10/02–06; A61B 2010/0208; A61B 2010/045; A61H 2201/5069
See application file for complete search history.

(56) References Cited

U.S. PATENT DOCUMENTS

| | | |
|---|---|---|
| 2,666,430 A | 1/1954 | Gispert |
| 4,164,871 A | 8/1979 | Cole et al. |
| 4,257,411 A | 3/1981 | Cho |
| 4,823,780 A | 4/1989 | Odensten et al. |
| 5,113,953 A | 5/1992 | Noble |
| 5,440,492 A | 8/1995 | Kozah et al. |
| 5,446,548 A | 8/1995 | Gerig et al. |
| 5,467,532 A | 11/1995 | Ames |
| 5,481,957 A | 1/1996 | Paley et al. |
| 5,484,029 A | 1/1996 | Eddison |
| 5,617,926 A | 4/1997 | Eddison et al. |
| 5,672,820 A | 9/1997 | Rossi et al. |
| 5,711,299 A | 1/1998 | Manwaring et al. |
| 5,799,055 A | 8/1998 | Peshkin et al. |

(Continued)

FOREIGN PATENT DOCUMENTS

| | | | |
|---|---|---|---|
| CN | 107981895 | * | 5/2018 |
| CN | 207 949 879 U | | 10/2018 |

(Continued)

OTHER PUBLICATIONS

Machine Translation of WO-2018143262-A1, Patent Translate, pp. 1-56, printed on Feb. 22, 23 (Year: 2018).*

(Continued)

*Primary Examiner* — Rene T Towa
(74) *Attorney, Agent, or Firm* — Maceiko IP

(57) ABSTRACT

An instrument handle for use with a system to measure and display the orientation of a handheld instrument is disclosed.

25 Claims, 22 Drawing Sheets

(56) References Cited

U.S. PATENT DOCUMENTS

| | | | |
|---|---|---|---|
| 5,870,832 A | 2/1999 | Slocum | |
| 6,045,508 A | 4/2000 | Hossack et al. | |
| 6,092,928 A | 7/2000 | Mattson et al. | |
| 6,221,082 B1 | 4/2001 | Marino et al. | |
| 6,254,572 B1 | 7/2001 | Knipfer et al. | |
| 6,261,247 B1 | 7/2001 | Ishikawa et al. | |
| 6,263,984 B1 | 7/2001 | Buckman, Sr. | |
| 6,568,850 B2 | 5/2003 | Vallin et al. | |
| 6,621,460 B2 | 9/2003 | Challoner | |
| 6,638,281 B2 | 10/2003 | Gorek | |
| 6,697,664 B2 | 2/2004 | Kienzle III et al. | |
| 6,725,080 B2 | 4/2004 | Melkent et al. | |
| 6,727,704 B2 | 4/2004 | Brune et al. | |
| 6,843,793 B2 | 1/2005 | Brock et al. | |
| 6,923,814 B1 | 8/2005 | Hildebrand et al. | |
| 7,611,522 B2 | 11/2009 | Gorek | |
| 7,942,826 B1 | 5/2011 | Scholl et al. | |
| 8,255,044 B2 | 8/2012 | Miles et al. | |
| 8,442,621 B2 | 5/2013 | Gorek et al. | |
| 8,591,431 B2 | 11/2013 | Calancie et al. | |
| 8,981,914 B1 | 3/2015 | Stetten | |
| 8,989,866 B2 | 3/2015 | Gharib et al. | |
| 9,119,572 B2 | 9/2015 | Gorek et al. | |
| 9,549,744 B2 | 1/2017 | Pommer et al. | |
| 9,554,812 B2 | 1/2017 | Inkpen et al. | |
| 9,795,451 B2 | 10/2017 | Gorek et al. | |
| 9,814,393 B1 | 11/2017 | Mao et al. | |
| 10,420,575 B2 | 9/2019 | Yoshimura | |
| 10,507,120 B2 | 12/2019 | Gharib et al. | |
| 10,507,587 B2 | 12/2019 | Uit De Bulten | |
| 10,716,509 B2 | 7/2020 | Kaula et al. | |
| 10,751,892 B2 | 8/2020 | Godlieb et al. | |
| 10,792,108 B2 | 10/2020 | Yang et al. | |
| 11,033,218 B2 | 6/2021 | Gharib et al. | |
| 11,191,592 B2 | 12/2021 | Gorek et al. | |
| 11,653,981 B2 | 5/2023 | van der Walt et al. | |
| 2002/0007188 A1 | 1/2002 | Arambula | |
| 2002/0095159 A1 | 7/2002 | Deloge et al. | |
| 2002/0161280 A1 | 10/2002 | Chatenever et al. | |
| 2003/0073901 A1 | 4/2003 | Simon et al. | |
| 2003/0114862 A1 | 6/2003 | Chu et al. | |
| 2003/0181919 A1 | 9/2003 | Gorek | |
| 2003/0199882 A1 | 10/2003 | Gorek | |
| 2004/0044295 A1 | 3/2004 | Reinert et al. | |
| 2004/0077973 A1* | 4/2004 | Groenke | A61B 10/025 600/567 |
| 2004/0087962 A1 | 5/2004 | Gorek | |
| 2004/0171924 A1 | 9/2004 | Mire et al. | |
| 2005/0021044 A1 | 1/2005 | Stone et al. | |
| 2005/0060006 A1 | 3/2005 | Pflueger et al. | |
| 2005/0075578 A1 | 4/2005 | Gharib et al. | |
| 2005/0085714 A1 | 4/2005 | Foley et al. | |
| 2005/0149054 A1 | 7/2005 | Gorek | |
| 2005/0251139 A1 | 11/2005 | Roh | |
| 2005/0267358 A1 | 12/2005 | Tuma et al. | |
| 2006/0025703 A1 | 2/2006 | Miles et al. | |
| 2006/0052826 A1 | 3/2006 | Kim et al. | |
| 2006/0235338 A1 | 10/2006 | Pacheco | |
| 2007/0055291 A1 | 3/2007 | Birkmeyer et al. | |
| 2008/0013678 A1 | 1/2008 | Magerl et al. | |
| 2009/0163901 A1 | 6/2009 | Fisher et al. | |
| 2009/0192534 A1 | 7/2009 | Ortiz et al. | |
| 2010/0036384 A1* | 2/2010 | Gorek | A61B 17/7091 606/104 |
| 2010/0100130 A1 | 4/2010 | Carl et al. | |
| 2010/0249658 A1 | 9/2010 | Sherman et al. | |
| 2012/0179070 A1 | 7/2012 | Pommer et al. | |
| 2013/0066334 A1* | 3/2013 | Schoepp | A61B 17/3403 606/130 |
| 2013/0081293 A1 | 4/2013 | Delin et al. | |
| 2013/0218166 A1* | 8/2013 | Elmore | A61B 90/06 606/104 |
| 2013/0253599 A1 | 9/2013 | Gorek et al. | |
| 2014/0246917 A1 | 9/2014 | Proud et al. | |
| 2015/0054753 A1 | 2/2015 | Morgan et al. | |
| 2015/0206456 A1* | 7/2015 | Foster | G09B 23/30 434/262 |
| 2016/0128704 A1 | 5/2016 | McGinley | |
| 2016/0242934 A1 | 8/2016 | Van der Walt | |
| 2017/0196561 A1 | 7/2017 | Shelton, IV et al. | |
| 2017/0231709 A1 | 8/2017 | Gupta et al. | |
| 2018/0035906 A1 | 2/2018 | Scholl et al. | |
| 2018/0280065 A1 | 10/2018 | Babic et al. | |
| 2019/0183463 A1* | 6/2019 | Keller | A61B 10/0275 |
| 2019/0209154 A1* | 7/2019 | Richter | A61B 17/00234 |
| 2019/0388155 A1 | 12/2019 | Cattin et al. | |
| 2019/0388173 A1 | 12/2019 | Pak et al. | |
| 2021/0228279 A1 | 7/2021 | Dorman | |
| 2022/0039877 A1 | 2/2022 | Frasier et al. | |
| 2022/0192761 A1 | 6/2022 | Shalayev et al. | |

FOREIGN PATENT DOCUMENTS

| | | | |
|---|---|---|---|
| DE | 10 2012 218 010 | 4/2014 | |
| WO | 2007129341 | 11/2007 | |
| WO | WO-2009055034 A1 * | 4/2009 | ......... A61B 17/1703 |
| WO | WO-2013044157 A1 * | 3/2013 | ........... A61B 17/025 |
| WO | 2016131016 | 8/2016 | |
| WO | WO-2018143262 A1 * | 8/2018 | ........... A61B 10/025 |

OTHER PUBLICATIONS

Machine Translation of CN 107981895, Patent Translate, pp. 1-6, printed on Nov. 1, 2023 (Year: 2018).*

PCT, International Search Report, International Application No. PCT/US2007/011962, Aug. 20, 2008, 1 page.

* cited by examiner

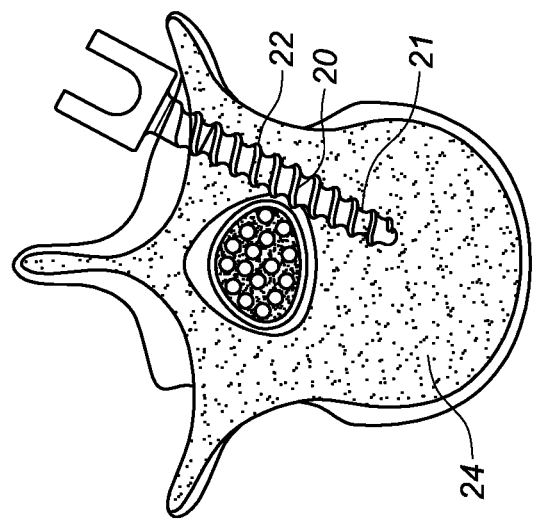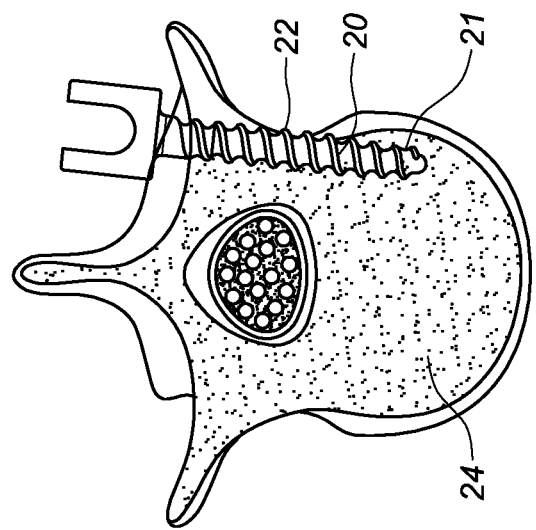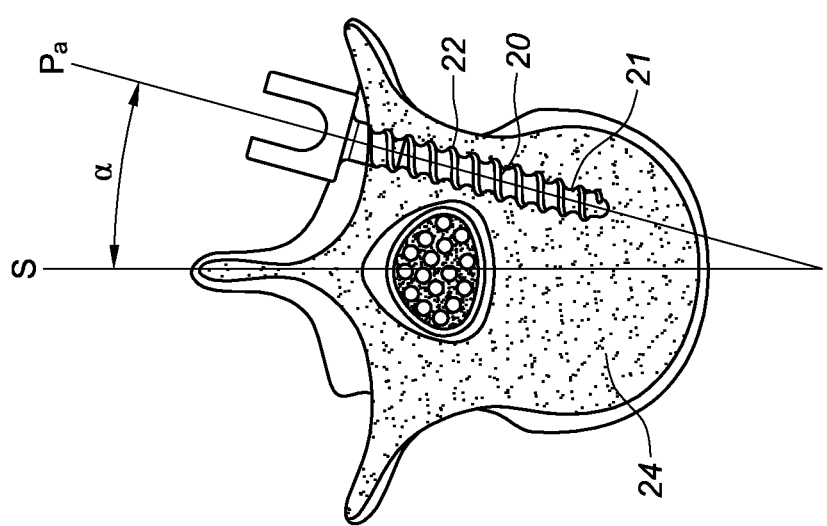

INSTRUMENT HANDLE FOR USE WITH INSTRUMENT ALIGNMENT FEEDBACK SYSTEM AND METHOD

CROSS-REFERENCE TO RELATED APPLICATION

This application claims the benefit of U.S. Provisional Application No. 62/912,618, filed Oct. 8, 2019, the contents of which are incorporated herein by reference.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to the alignment of instruments, including the angular alignment of surgical instruments such as those used in spinal stabilization surgeries, and including an instrument handle that may be used in connection with such alignment.

BACKGROUND OF THE INVENTION

Thousands of spinal stabilization surgeries are performed every year. During the procedures, stabilizing structures, such as spinal rods and/or plates, are implanted to provide support to the patient's spine. The procedures may also involve the use of pedicle screws that may be embedded into the patient's spine to secure the rods/plates.

The implantation of the pedicle screws may involve first drilling a pilot hole through the pedicle and into the vertebral body of the patient's spine. The pedicle screw may then be implanted into the pilot hole.

In order to properly place the pedicle screw and avoid damaging the patient's spinal column, the position, angular orientation and trajectory of the pilot hole must be precisely executed.

Imaging instrumentation (such as fluoroscopic imaging systems) may provide images of the patient's spine to assist in the placement of the pilot holes, but the images may be limited in the real time information that they may provide during the procedure. In addition, the use of such systems may expose the patient and the doctors/nurses to high levels of ionized radiation, such that extended use of such systems may be undesirable. Also, a skilled surgeon may rely on his/her experience in order to properly place the pilot holes, but the experience level of each surgeon may vary and may not be adequate in many cases.

In fact, studies have shown that up to 4% of pedicle screws implanted during spinal stabilization surgeries may be misaligned. Such misalignment may cause significant health complications to the patients and in many cases the pedicle screws may require revision, thus requiring additional surgeries.

Other types of surgical/medical procedures may also require the precise alignment of the surgical instruments used. For example, hypodermic needles may often times require proper positioning and alignment during use.

Accordingly, there is a need for a system and method that provides real time feedback regarding the angular orientation, position and trajectory of surgical instruments.

Jamshidi needles have been used for taking biopsies and in surgeries for some time. Jamshidi needles typically include a handle for the surgeon to grasp while using the needle. However, existing Jamshidi needles have not included any feature to aid in their alignment during a procedure. Accordingly, there is a need for an improved handle for a Jamshidi needle and other types of surgical instruments.

SUMMARY OF THE INVENTION

The present invention is specified in the claims as well as in the below description.

In one embodiment, a system for providing feedback regarding the orientation of a handheld instrument may include at least one measurement sensor configured with the handheld instrument, and a controller in communication with the at least one measurement sensor; wherein the at least one measurement sensor may measure the orientation of the instrument, and the controller may provide feedback based on the measured orientation.

In one aspect, the instrument may be selected from the group: an awl, a probe, a tap, a drill, a screw driver, a scalpel and a hypodermic needle.

In another aspect, the at least one measurement sensor may include at least one accelerometer.

In another aspect, the at least one measurement sensor may include at least one gyroscope.

In another aspect, the measured orientation may be an orientation in three-dimensional space.

In one embodiment, an assembly adapted to measure the orientation of a surgical instrument may include at least one measurement sensor configured with the surgical instrument; wherein the at least one measurement sensor may measure the angular orientation of the surgical instrument, and output a signal based on the measured angular orientation.

In one aspect, the assembly may include a controller in communication with the at least one measurement sensor, wherein the controller may receive the signal and provide feedback based on the measured angular orientation of the surgical instrument.

In another aspect, the surgical instrument may be a handheld instrument.

In another aspect, the surgical instrument may be selected from the group: an awl, a probe, a tap, a drill, a screw driver, a scalpel and a hypodermic needle.

In another aspect, the at least one measurement sensor may include at least one accelerometer.

In another aspect, the at least one measurement sensor may include at least one gyroscope.

In another aspect, the measured orientation may be an orientation in three-dimensional space.

In one embodiment, a handheld surgical instrument adapted to provide feedback regarding its orientation may include at least one measurement sensor configured with the surgical instrument; wherein the at least one measurement sensor may measure the angular orientation of the surgical instrument, and output a signal based on the measured angular orientation.

In one aspect, the surgical instrument may also include a controller in communication with the at least one measurement sensor, wherein the controller may receive the signal and provide feedback based on the measured angular orientation of the surgical instrument.

In another aspect, the surgical instrument may be selected from the group: an awl, a probe, a tap, a drill, a screw driver, a scalpel and a hypodermic needle.

In another aspect, the at least one measurement sensor may include at least one accelerometer.

In another aspect, the at least one measurement sensor may include at least one gyroscope.

In another aspect, the measured angular orientation may be an orientation in three-dimensional space.

In one embodiment, a method for aligning a handheld surgical instrument that may include at least one measurement sensor and a controller in communication with the at least one measurement sensor, may include:

(A) configuring the at least one measurement sensor with the surgical instrument;

(B) using the at least one measurement sensor to measure the angular orientation of the surgical instrument;

(C) providing the measured angular orientation information in (B) to the controller; and (D) using the controller to provide feedback based on the angular orientation information.

In one aspect, the method may also include:

(E) aligning the surgical instrument based on the feedback provided in (D).

In an aspect of the invention, the alignment measurement and feedback instrument may be used connection with a Jamshidi needle for procedures ranging from bone marrow aspirations and biopsies to vertebral augmentation procedures such as Kyphoplasty and Vertebralplasty, and other procedures. The feedback may be used to orient the Jamshidi needle to a proper orientation during a surgical procedure.

In another aspect, the invention involves an improved handle for a Jamshidi needle that includes an attachment area adapted to receive the measurement assembly that may communicate with the controller to provide alignment feedback.

The attachment area may include a recess. The recess generally corresponds in size and shape to the measurement assembly so that the measurement assembly may fit within the recess. Alternatively, the recess may include a slot and the measurement assembly may include a protrusion that fits within the slot. With the protrusion configured within the slot, the measurement assembly may be held in position within the recess. Alternatively, the attachment area may include a surface that may receive the measurement assembly.

Alternatively, the attachment area may include a cavity with an inner volume that may receive the measurement assembly into the inner volume. The inner volume may include a lid that when opened may allow for the measurement assembly to be placed within the cavity. The inner volume may include an opening through which the measurement assembly may be inserted into the cavity.

The attachment area may include alignment mechanisms such as alignment marks, alignment detents and other types of alignment mechanisms.

In another aspect of the current invention, the improved Jamshidi needle handle may include a front portion and a back portion. The front and back portions may be separable. In some embodiments, the front and back portions may be detached to facilitate insertion of the instrument assembly.

The measurement assembly measures the angular orientation of the handheld surgical instrument and outputs the measurement information to the controller. The controller receives the information from the measurement assembly and provides feedback based on the measured angular orientation of the instrument.

In one aspect, the feedback is provided in real time.

A person of ordinary skill in the art will understand, that any method described above or below and/or claimed and described as a sequence of steps is not restrictive in the sense of the order of steps.

BRIEF DESCRIPTION OF THE DRAWINGS

Various objects, features and attendant advantages of the present invention will become fully appreciated when considered in conjunction with the accompanying drawings, in which like reference characters designate the same or similar parts throughout the several views, and wherein:

FIGS. 2A, 2B and 2C show the manners in which a pedicle screw may be implanted, e.g., properly as in FIG. 2A according to exemplary embodiments hereof; and improperly as in FIGS. 2B-2C.

DETAILED DESCRIPTION OF THE PREFERRED EMBODIMENTS

In general, the system according to exemplary embodiments hereof provides devices, tools, instrumentation, software and methods to assist in the proper alignment of devices. The devices to be aligned may include hand tools and/or instruments of any kind, for example, including but not limited to: surgical instruments, hand drills, screw drivers, awls, probes, taps, saws, files, plyers, tweezers, scalpels, hypodermic needles and other types of hand held devices, non-hand held devices and tools. It will be understood by a person of ordinary skill in the art, upon reading this specification, that the system and method may be used with any type of device that may benefit from being aligned in one, two or three dimensions, and that the scope of the system and method is not limited in any way by the types of devices that it may be used with.

For the purpose of this specification and for demonstration, the system and method will be described in relation to its use with surgical instruments (e.g., instruments used for orthopedic surgery). However, it is appreciated that the system and method may be applied to and used with any type of device that may benefit from it.

Referring now to FIGS. 1-12, the system 10 according to exemplary embodiments hereof will be described in further detail. In a presently preferred implementation, the system 10 may be used to provide feedback relating to the three-dimensional navigation and alignment of handheld surgical instruments. In one presently preferred implementation, the surgical instruments may include instruments used to perform orthopedic surgery, e.g., spinal stabilization surgery.

Figure 1:
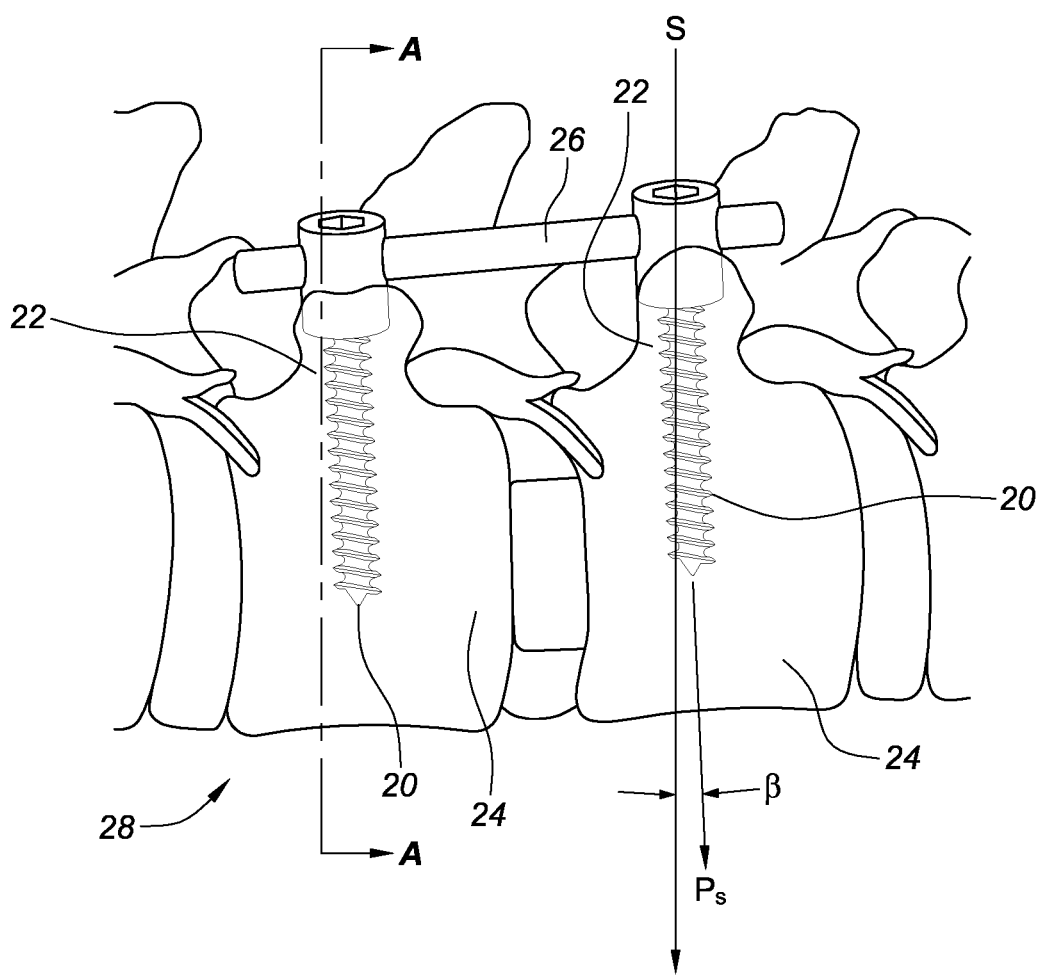
FIG. 1 shows aspects of a pedicle screw and rod according to exemplary embodiments hereof.

In one implementation, the surgical instruments may include devices used to implant pedicle screws into a patient's spine. As shown in FIG. 1, the pedicle screws 20 may preferably be implanted through the pedicle 22 and into the vertebral body 24 of the patient. A linkage unit 26 (e.g., a spinal rod or plate) may then be attached to the pedicle screws 20. Two or more pedicle screws 20 may typically be used to secure each rod/plate 26 (e.g., one pedicle screw 20 on each end of each rod 26) so that the rod/plate 26 may be generally oriented parallel to the spinal column 28 of the patient. In this way, the linkage 26 may be held secure by the pedicle screws 20 and provide stability to the particular segment of the spine on which it may be attached.

It may be preferable that the spinal rod 26 be intraoperatively contoured during the surgical procedure to properly fit between the implanted pedicle screws 20. For instance, it may be preferable to use an intraoperative spinal rod contouring system as described in U.S. Provisional Application No. 62/762,478 filed May 7, 2018, and U.S. application Ser. No. 16/140,491, entitled Surgical Implant Preparation System and Method, filed on even date herewith, the entire contents of which are incorporated herein by reference for any purposes.

The sagittal angle β of the right pedicle screw 20 is shown in FIG. 1. The angle β of the angular trajectory $P_s$ of the pedicle screw 20 may be measured with respect to the vertical axis S (e.g., the vertical plumb line) along the sagittal plane. The placement of the pedicle screws 20 in FIG. 1 may be deemed as accurate as the screws 20 pass from the pedicle 22 into the vertebral body 24 without perforating any cortical walls.

FIGS. 2A, 2B and 2C are taken from the perspective along cut line A-A in FIG. 1 (along the axial or transverse plane).

FIG. 2A shows a pedicle screw 20 within a pilot hole 21 and with an axial angle α (lateral to medial trajectory). The angle α of the angular trajectory $P_a$ of the pedicle screw 20 may be measured with respect to the vertical axis S (e.g., the vertical plumb line) along the axial plane. The placement of the screw 20 may be deemed as accurate as it passes through the pedicle 22 and into the vertebral body 24 without breaching and/or perforating the lateral or medial cortical walls.

FIG. 2B depicts a pedicle screw 20 within a pilot hole 21 breaching and/or perforating the lateral cortical wall, and FIG. 2C depicts a pedicle screw 20 within a pilot hole 21 breaching and/or perforating the medial cortical wall. The pedicle screw placements shown in FIGS. 2B and 2C are deemed inaccurate, and may cause significant neurological problems for the patient, including but not limited to, chronic pain, numbness, limited mobility and paralysis. Thus, depending on the patient's neurological symptoms, inaccurately placed pedicle screws 20 may need to be revised with an additional surgery, adding additional risks and complications to the patient.

In addition, given that the linkage unit 26 may be secured between two or more pedicle screws 20 (as shown in FIG. 1), it can be seen that the pedicle screws 20 may also be required to be properly aligned with respect to one another such that the linkage unit 26 may safely pass between the pedicle screws 20 without obstruction and without applying undesired strain or torque onto the screws 20 or onto the patient's spinal column 28.

Given these considerations, it can be understood that an accurate lateral to medial and cephalic to caudal trajectory and alignment for each pedicle screw 20 is paramount for a successful surgical outcome.

The System

Figure 3:
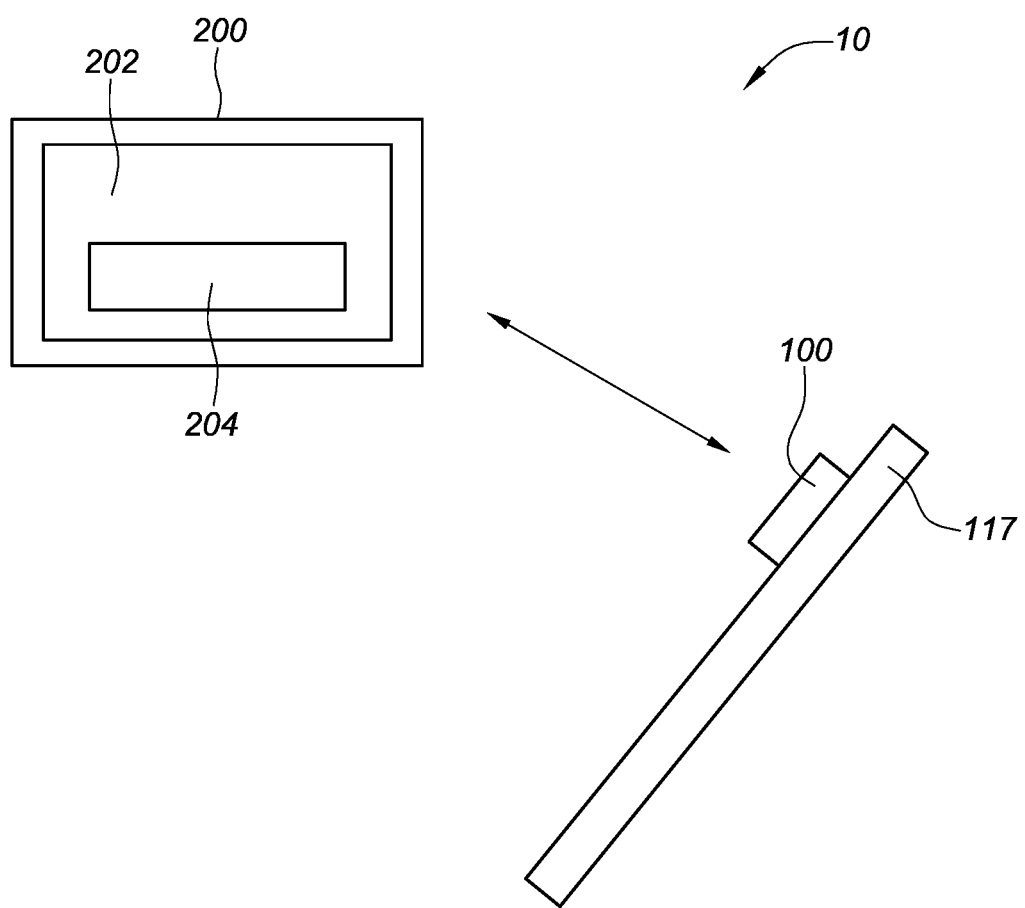
FIG. 3 shows aspects of an alignment feedback system according to exemplary embodiments hereof.

In one exemplary embodiment hereof, the system 10 may include a measurement assembly 100, a controller 200 and other elements, components and mechanisms as necessary to perform its various functionalities. As shown in FIG. 3, the measurement assembly 100 may be configured with an instrument 117 (e.g., a hand tool) that may require proper alignment. In general, the measurement assembly 100 may measure the real time three-dimensional position, orientation and trajectory of the instrument. In this way, the user of the instrument may utilize this positional information to ensure that the instrument is in the proper orientation during its use. As such, for example, the instrument 117 associated with implanting the pedicle screws 20 may be properly aligned so that the pedicle screws 20 may be implanted correctly as shown in FIG. 2A.

The controller 200 may be in communication with the measurement assembly 100 and may generally receive information and data from the measurement assembly 100, and send information and data to the measurement assembly 100. The controller 200 may also process information received from the measurement assembly 100 and provide feedback to the user of the system 10 based on the information received. The controller 200 may also receive inputs from the user as well as interface with other systems including other controllers and systems.

The controller 200 may include any type of controller 200 including but not limited to: a tablet computer, a smartphone, a mobile device, a laptop computer, a PC, a networked controller, a server (e.g., a network, backend or cloud platform), a micro-controller and any other types or combinations of types of controller 200. The controller 200 may include one or more displays 202 that may be used to display data, feedback or other types of information. The controller 200 may also include one or more interfaces 204 (such as touchscreens, keyboards, mouse, etc.) that may be used by the user to interact with the controller 200 (e.g., for data input).

Using spinal stabilization surgery as an example implementation, a surgeon may utilize a surgical hand tool 117 (e.g., an awl) that may be configured with the measurement assembly 100. In one example, the awl may be used to prepare a pilot hole within the patient's spine for insertion of a pedicle screw 20. The measurement assembly 100 may, in real time, measure the three-dimensional position, alignment, orientation and trajectory of the awl, and may provide this positional data to the controller 200.

The controller 200 may then process the data and provide feedback (e.g., visual, textual, audible, etc.) to the surgeon regarding the trajectory of the awl and thus, that of the resulting pilot hole. In this way, the surgeon may utilize real time feedback from the system 10 in order to accurately guide the awl in the correct orientation to result in a properly oriented pilot hole. The pedicle screw 20 may then be inserted into the pilot hole and be thereby properly positioned.

It is understood that the above example is meant for demonstration, and that the system 10 may be used with other types of instruments performing other types of procedures.

The various elements of the system 10 will next be described in further detail.

The Measurement Assembly

Figure 4:
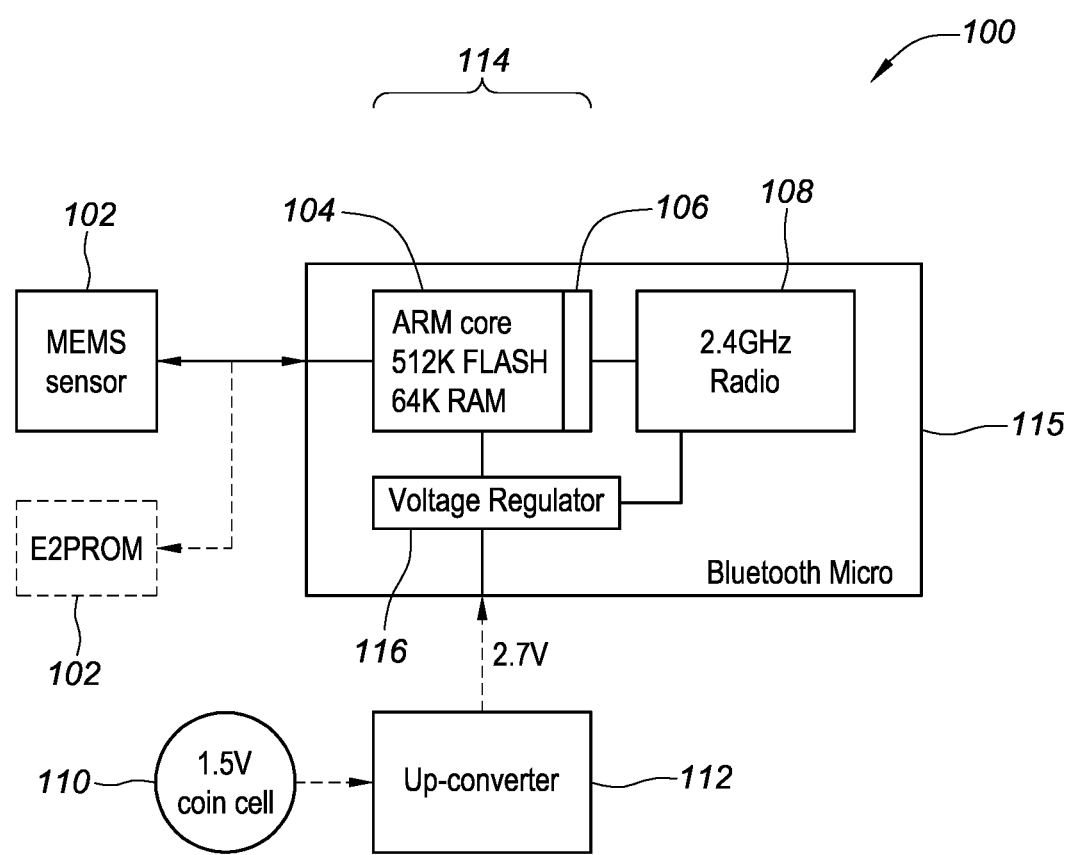
FIGS. 4-6 show aspects of a measurement assembly according to exemplary embodiments hereof.
Figure 5:
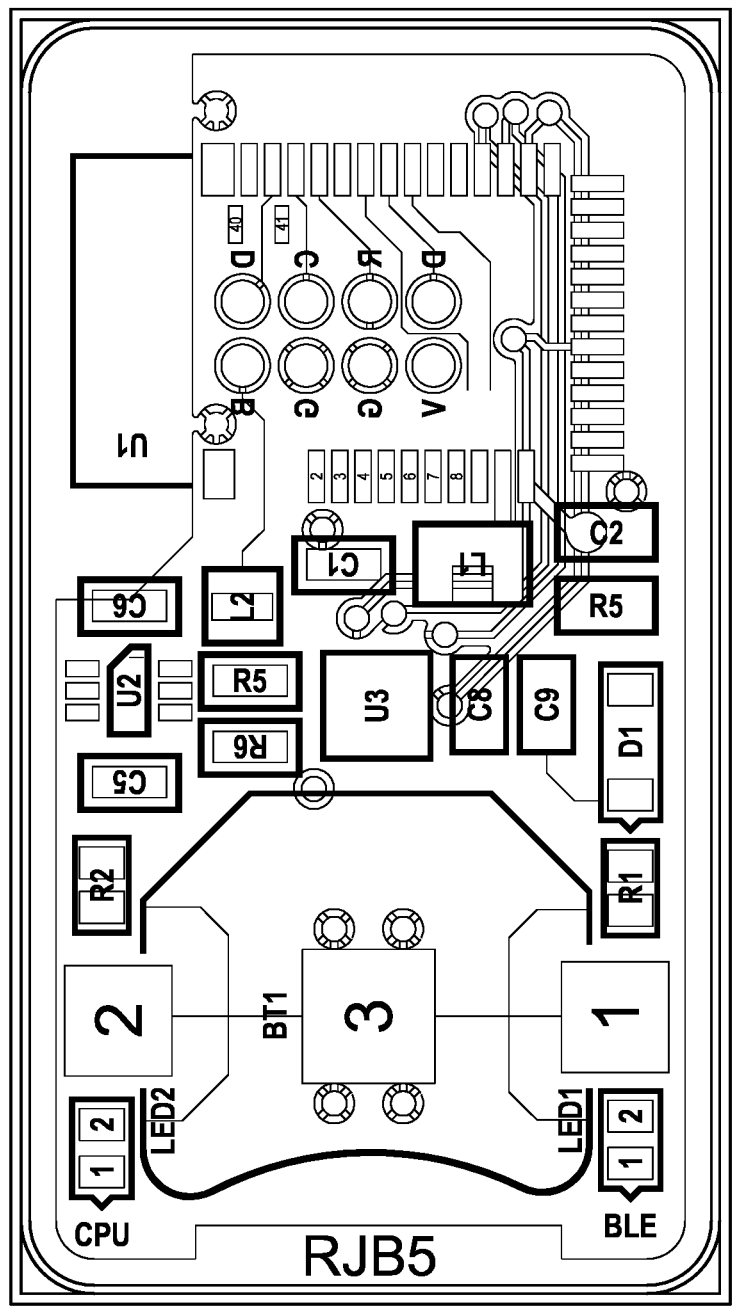

Referring to FIG. 4, according to exemplary embodiments hereof, the measurement assembly 100 may generally include at least one sensor 102, at least one processor 104, memory 106, at least one radio 108, a power supply 110, a voltage converter 112 and other components and elements that may be necessary for the assembly 100 to perform its desired functionalities. Depending on the application of the instrument 117 and of the measurement assembly 100, the assembly 100 may include some or all of the elements described above, and/or additional elements as required.

The sensor 102 may include any type of sensor 102 that may measure, sense or otherwise allow for the determination of the one, two or three-dimensional orientation of the assembly 100. In one exemplary embodiment hereof, the sensor 102 may be an accelerometer, such as a tri-axial (three-axis) micro-electro-mechanical system (MEMS) accelerometer. As is known in the art, an accelerometer 102 may measure both dynamic and static acceleration. By measuring the amount of static acceleration due to terrestrial gravity, the orientation (angle and/or tilt) of the sensor 102 may be determined.

A tri-axial MEMS accelerometer 102 may provide simultaneous measurements in three orthogonal directions, thus providing three-dimensional orientation and trajectory information. The output of the accelerometer 102 may be an electrical charge (e.g., a voltage waveform) that may be proportional to the force exerted on it at any given moment in time. This electrical charge may then be processed to provide real time positional and trajectory data of the unit 100.

The sensor(s) 102 may include piezoelectric, piezoresistive, capacitive or other components to convert mechanical or physical motion into an electrical signal. In one example, the sensor 102 may include three micro-machined pivot arms that may deflect upon acceleration (e.g., gravity). The deflection may be detected by a capacitive sensor and converted into a numerical value (e.g., in units of micro-g or μg). In another example, the sensor 102 may include one or more cantilever beams each with a proof mass (also referred to as a seismic mass) that may deflect under the influence of external accelerations. In another example, the sensor may include one or more gyroscopes (preferably MEMS gyroscopes). Other types and architectures of sensors 102 may also be used, and it is understood that the scope of the system 10 and of the measurement assembly 100 is not limited in any way by the types of sensors 102 that the assembly 100 may utilize.

In one presently preferred implementation, the sensor 102 may be a three-axis accelerometer manufactured by STMicroelectronics (e.g., part number LIS3DSH). It is understood that other sensors 102 manufactured by other manufacturers may also be used.

In one exemplary embodiment hereof, the processor 104 and the memory 106 may be formed together as a microcontroller 114. The microcontroller 114 may also include programmable input/output peripherals as well as other elements such as a voltage regulator 116. The microcontroller 114, radio 108, voltage regulator 116 (as well as other elements and components) may be provided as an integrated system-on-a-chip (SoC) 115. In this way, the unit 100 may be reduced in size. FIG. 4 shows one presently preferred electrical layout of the assembly 100. Note however that other electronic layouts may also be used. In one example, the device 100 may measure 0.8 inches×1.5 inches×0.5 inches, but the device 100 may also be formed in other sizes.

The radio 108 may be a Bluetooth radio that may transmit and receive information at 2.45 GHz to and from the controller 200 (and/or to and from other devices). In one presently preferred implementation the radio 108 may have an output power of 0.0023 watts (e.g., Bluetooth low energy protocol), but other output powers may also be used. In addition, the transmission rate may be 1-2 times per second, but other transmission rates may also be used.

The radio 108 may also be any other kind of radio 108 or combinations of radios 108 that may transmit and receive information at any other frequencies using any types of communication protocols, analog or digital, or any combination thereof. For example, the radio 108 may utilize RF, millimeter wave, Wi-Fi, LAN, WAN, Internet, cellular connectivity, telephony, IR or other types of communication protocol or methods. The radio 108 may also include an antenna, I/O ports and any other type of communications mechanisms as necessary.

In one presently preferred implementation, the transmitter 108 may be manufactured by Raytac Corp. (e.g., part number MDBT42Q, FCC identifier SH6MDBT42Q, certificate number 162181172/AA/00). It is understood that other transmitters 108 manufactured by other manufacturers may also be used.

The power supply 110 may preferably be a battery but may also comprise other types of power storage devices. In one example, the battery 110 may be a 1.5 v coin cell and the voltage converter 112 may be a DC-DC converter 112 that may boost the 1.5 v to 2.7 v as required by the other components in the assembly 100.

In addition, the measurement assembly 100 may also include one or more external non-volatile (E2PROM) memory chips 116 that may be used to augment the internal memory 106 of the SoC 115.

Figure 6:
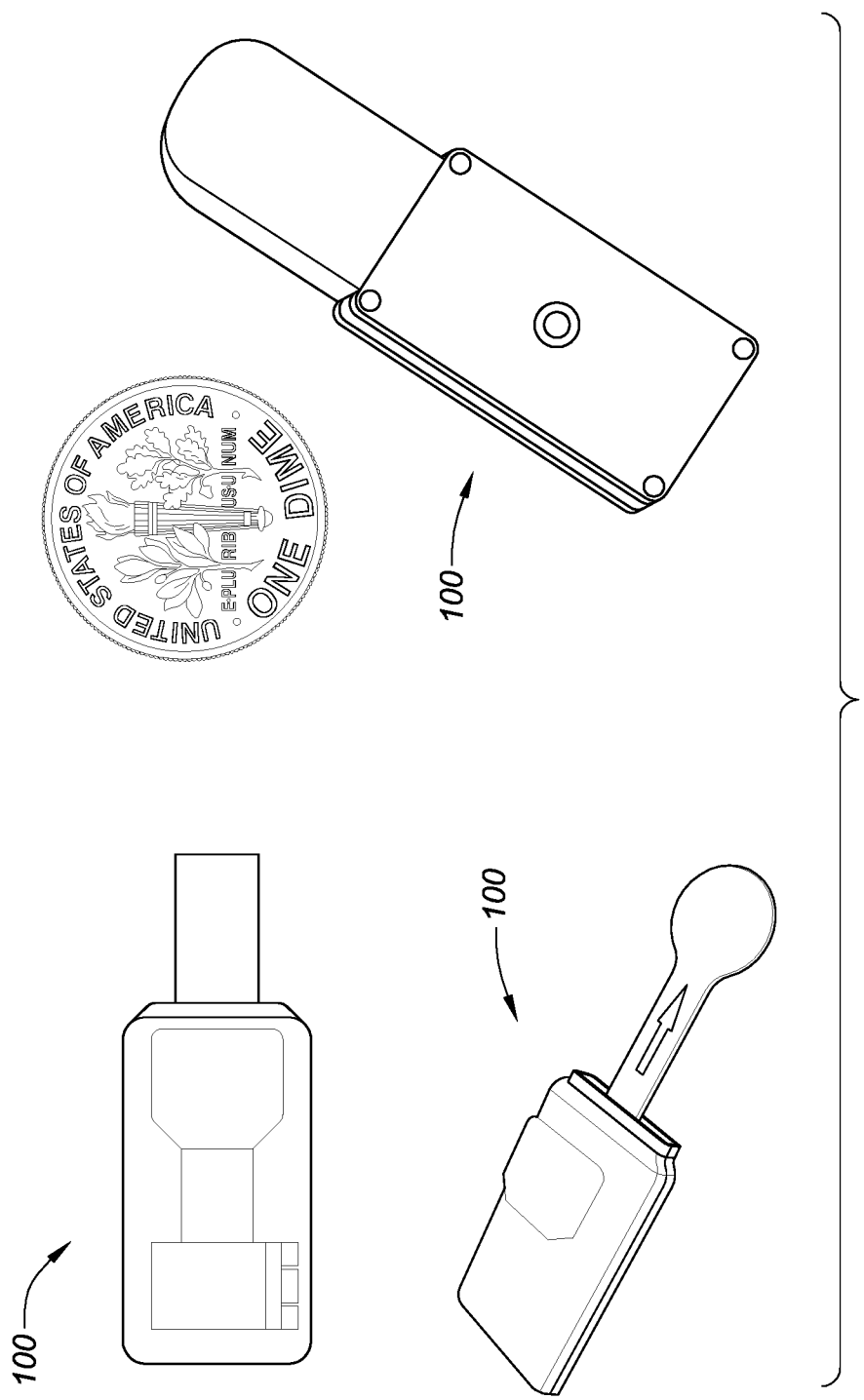

The assembly 100 may preferably be packaged as a small single unit device as shown in the different views depicted in FIG. 6.

Figure 7:
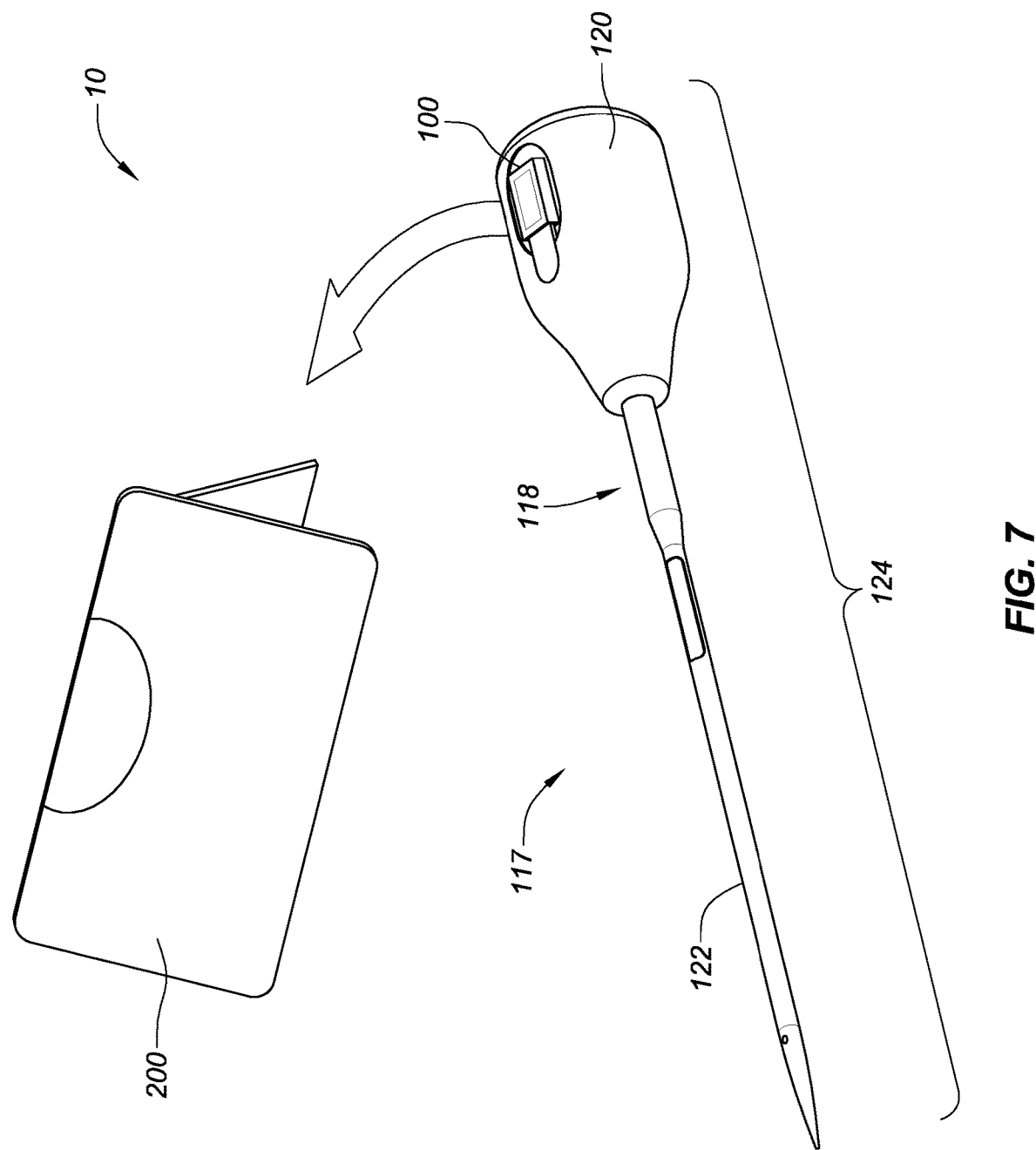
FIG. 7 shows aspects of an active instrument according to exemplary embodiments hereof.

In one exemplary embodiment hereof, the measurement assembly 100 may be configured with a handheld instrument 117, the use of which may benefit from being properly aligned. Following the example of using surgical instruments, the instrument 117 may be an awl 118 as shown in FIG. 7. The awl 118 may include a handle 120 configured with a shaft 122 as shown. The shaft 122 may include a distal tip that may be sharpened to a point with two or more sharpened side edges. As is known in the art, an awl 118 may be used to bore a hole in a material, and in this example, the awl 118 may be used to bore a pilot hole 21 through the pedicle 22 and into the vertebral body 24 of a patient's spine for the insertion of a pedicle screw 20.

The surgeon may hold the awl 118 by the handle 120 and place the distal tip of the shaft 122 at the position on the bone where the hole may be desired. The awl 118 may be rotated back and forth along the axis defined by the shaft 122 and the sharpened tip of the shaft 122 may bore the hole 21.

It can be seen that the orientation and alignment of the awl's shaft 122 during this procedure may determine the orientation and trajectory of the resulting pilot hole 21. It can also be seen that when the pedicle screw 20 may be screwed into the resulting pilot hole 21, the screw 20 may also follow the trajectory of the hole 21.

During this procedure, the measurement assembly 100 may measure the orientation and trajectory of the awl 118 (the shaft 122) and provide this information to the controller 200. The controller 200 may process the information and provide it to the user. The user of the awl 118 may then utilize this real time positional information to properly manipulate the awl 118 in the correct orientation to result in a properly oriented pilot hole 21 (and thus, a properly oriented pedicle screw 20 once inserted). This will be described in further detail in later sections.

In one presently preferred implementation as shown, the measurement assembly 100 may be configured with the handle 120 of the awl 118. However, it is understood that the assembly 100 may also be configured with the shaft 122 and/or any other element of the awl 118, and in any position on the awl 118.

The measurement assembly 100 may be attached to or otherwise configured with the instrument 117 during the manufacturing process of the instrument 117, or may be retrofitted with the instrument 117 as an after-market component. The measurement assembly 100 may be longitudinally aligned with the axis defined by the shaft 122 of the instrument so that the coordinate system used by the sensor 102 may be aligned with that of the instrument 117. This will be described in further detail in later sections. However, the assembly 100 may also be aligned in other orientations with respect to the instrument 117.

The instrument's handle 120 may include a section that may be provided to receive the assembly 100, such as a flat section, a slot, an internal cavity, or any other type of section that may accommodate the assembly 100 and allow for its secure attachment. Another example of the section to receive the assembly 100 may be a recess, such as described below in connection with an embodiment that may involve a Jamshidi needle. However, this may not be required (e.g., when the assembly 100 may be configured with the instrument 117 as an after-market component). The measurement assembly 100 may be secured to the instrument (e.g., the handle 120) with adhesive (e.g., 3M sterile surgical adhesive), double-sided tape, screws, bolts, straps, bands, latches, a snap-in arrangement with a lip, a pressure fit or any other type of attachment mechanism(s). For the purposes of this specification, an instrument 117 configured with a measurement assembly 100 may be referred to as an active instrument 124.

Prior to use, it may be preferable to calibrate the measurement assembly 100 (the active instrument 124) to verify the measurement assembly's amplitude response, system linearity and other performance characteristics over the intended range of use. In this way, the sensor 102 may be verified as performing within its specifications. The calibration may also provide a set of scale factors (calibration factors, correction factors, etc.) that may be used to correlate the electrical outputs of the assembly 100 with the real world physical coordinates of the assembly 100.

The calibration factors may be applied to the output signals of the assembly 100 in order to correct for the sensor's known deficiencies. In general, the calibration procedure may typically include the measurement and calibration of the sensor's reference sensitivity, frequency response, output bias level, transverse sensitivity, resonant frequency, time constant and other characteristics. In this way, during use, the calibration factors may be applied to the raw data received from the measurement assembly 100 and the real time angular position and trajectory of the assembly 100 may be determined within a calculated level of accuracy and uncertainty.

A reference standard, such as a standard calibrated at the United States National Institute of Standards and Technology (NIST), may be used to calibrate the active instrument 124. Alternatively, and more typically, a reference standard may be used to calibrate a transfer standard that may then be used to calibration the active instrument 124. In either case, this may allow for the absolute accuracy and the measurement uncertainty of the measurement assembly 100 (and the active instrument 124) to be assessed and optimized. It may be preferable to also test the measurement repeatability of the active instrument 124 across a series of measurements and to use this information when calculating the assembly's uncertainty.

A number of different types of calibration procedures may be used to calibrate the active instrument 124, and the proper calibration technique may be chosen depending on the type of sensor 102 employed in the assembly 100 and the instrument's desired range of use. The active instrument 124 may be calibrated prior to each use, after each use (to verify that the instrument 124 did not change or drift during use), periodically (preferably on a periodic schedule), or during any other times. It is understood that the scope of the system 10, of the measurement assembly 100 and of the active instrument 124 is not limited in any way by the types of calibration procedures used or the intervals over which the calibrations may be performed.

The Controller

In one exemplary embodiment hereof, the controller 200 may include a tablet computer, a smartphone, a mobile device, a laptop computer, a PC, a networked controller, a server (e.g., a network, backend or cloud platform), a micro-controller and any other types or combinations of types of controllers 200. The controller 200 may also include an operating system and software, scripts, applications (including mobile applications) and other types of code that the controller 200 may run or otherwise utilize.

The controller 200 may receive information from and send information to the active instrument 124 in real time. The controller 200 may be paired with the active instrument 124 via Bluetooth communications, or may utilize other types of communication protocols or methods such as RF, millimeter wave, Wi-Fi, LAN, WAN, Internet, cellular connectivity, telephony, IR or other types of communication methods, digital or analog or any combination thereof. The controller 200 may also communicate with other instrumentation (e.g., imaging instrumentation) as required using the same or different communication methods.

In one exemplary embodiment hereof, the controller 200 may receive information from the active instrument 124 indicating the instrument's real time orientation and trajectory (preferably in three dimensions) during use. The controller 200 may then process the positional data and provide it to the user in meaningful real world formats, preferably correlated with one or more three-dimensional coordinate systems (described later). The controller may also apply the calibration factors (e.g., scale factors or correction factors) of the particular active instrument 124 to increase the accuracy of the data.

Details of how the controller 200 may be used during the use of the active instrument 124 will be described in later sections.

The controller 200 may also be used to automate the calibration procedure described in prior sections. For example, the controller 200 may provide software wizards or other types of interactive tools that may guide the user during the calibration processes.

The controller 200 may also provide software wizards or other types of interactive tools that may guide the user during the use of the active instrument 124 as will be described in later sections.

Note that any number of measurement assemblies 100 may be configured with the system 10, and that each assembly 100 may be configured with a different active instrument 124. For example, a first measurement assembly 100 may be configured with an awl 117 as described above, a second measurement assembly 100 may be configured with a probe 117, a third measurement assembly 100 may be configured with a driver 117, and so on. Another instrument assembly may be configured with a Jamshidi needle as described below. Each measurement assembly 100 may include a unique electronic identifier (e.g., a serial number, an IP address, etc.) that the controller 200 may query, identify and record. In this way, the controller 200 may simultaneously monitor (or otherwise communicate) with each measurement assembly 100 individually.

In Use

Prior to surgery, the patient's spine may be stabilized by placing the patient on a radiolucent operating table in the prone position. With the patient's spine stabilized, imaging instrumentation (e.g., C-arm fluoroscopic imaging instrumentation) may be used to take sequences of images of the patient's spine from different perspectives. The images may then be used to construct one, two and/or three-dimensional representations of the spine. It may be preferable that the imaging instrumentation also be calibrated per its specifications as required.

In one exemplary embodiment hereof, the controller 200 (or possibly the imaging instrumentation) may use the imaging data to model, calculate or otherwise determine the proper (optimal) position, alignment (preferably in three-dimensions) and trajectory of each pilot hole for each pedicle screw 20 to be implanted. Alternatively, the controller may allow the user to interact with the controller 200 to lay out the proposed position, orientation and trajectory of each proposed pilot hole manually. For example, the controller 200 may display the representations of the patient's spine such that the user may draw (or otherwise input) the proposed position, orientation and trajectory of each pilot hole onto the layout.

Figure 8:
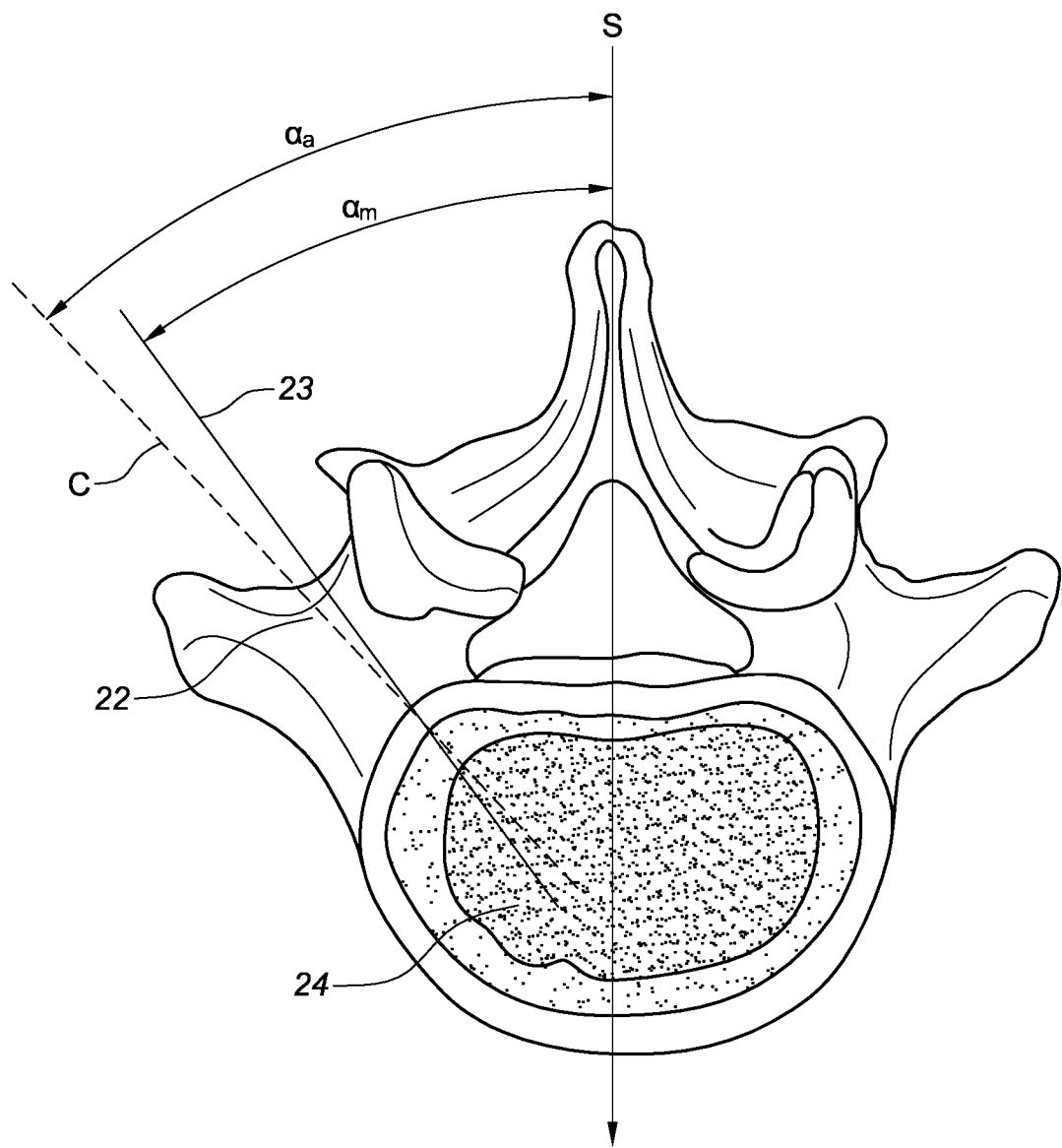
FIGS. 8 and 9 show aspects of a data layout and/or display according to exemplary embodiments hereof.

The controller 200 may also provide software wizards or other types of interactive tools that may assist the user in laying out and/or otherwise determining the position of the proposed pilot holes. For the purposes of this specification, the proposed pilot holes (whether determined by the controller 200, the user, any other system or any combination thereof) may be referred to as modeled pilot holes 23 as shown in FIG. 8.

The controller 200 may also perform quality checks on each modeled pilot hole 23 to ensure that the modeled holes 23 are indeed in the proper positions and orientations. And if potential problems are discovered, the controller 200 may bring this to the attention of the user for review. For example, the controller 200 may check to ensure that the axial and sagittal angles ($\alpha$ and $\beta$ respectively) of each pedicle screw 20 are correct and that no cortical perforations exist. The controller 200 may also ensure that the pedicle screws 20 may be properly aligned with respect to one another such that the linkage unit 26 may be attached between the screws 20 without obstruction and without applying undesired strain or torque on the screws 20 or on the patient's spinal column 28.

The position and alignment information for each modeled pilot hole 23 may include, but may not be limited to, the modeled pilot hole 23 entry point information, angular orientation, trajectory information, length information, the location, orientation and/or position of any adjacent pedicle screw pilot holes 23, the location, orientation and/or position of any associated linkage unit(s) 26, as well as other information and/or any combinations of information thereof. It may be preferable that the modeled orientation and trajectory of each modeled pilot hole 23 describe/show the hole 23 as passing through the pedicle 22 and into the vertebral body 24 without cortical perforations (as shown in FIG. 2A). The information may be complex (vector) information.

As is known in the art, three commonly used coordinate systems may be used in imaging applications and surgical procedures, including but not limited to, a world coordinate system, the anatomical coordinate system and the image coordinate system. The world coordinate system may typically include a Cartesian coordinate system and may be used to represent the position and orientation of the patient. The anatomical coordinate system (also referred to as the patient coordinate system) may consist of three planes that describe the standard anatomical position of a human body: 1) the axial plane may be parallel to the ground and may separate the head (Superior) from the feet (Inferior), 2) the coronal plane may be perpendicular to the ground and may separate the front (Anterior) from the back (Posterior), and 3) the sagittal plane may be perpendicular to the ground and may separate the Left from the Right. The image coordinate system may describe how each image was acquired with respect to the anatomy, and may consist of an origin, an i-axis increasing to the right, a j-axis increasing to the bottom, and a k-axis increasing backwards (all orthogonally).

It may be preferable that the coordinate systems used by the various instrumentation (e.g., the active instrument 124, the controller 200, the fluoroscopic imaging system, etc.) be correlated. In this way, real time angular orientation and trajectory data taken from the active instrument 124 may be accurately correlated and overlaid with the imaging data taken by the fluoroscopic imaging system. This may also allow the surgeon to understand the coordinate system he/she may use while manipulating the active instrument 124. For example, the surgeon may manipulate the axial angle $\alpha$ (FIG. 2) and the sagittal angle $\beta$ (FIG. 1) of the active instrument 124 with respect to a vertical reference such as a plumb line. The plumb line may be generally parallel or generally correspond to the vector that may represent the acceleration due to the force of gravity as measured by the sensor 102 (e.g., accelerometer). The starting position of the pilot hole 21 may be determined from the modeled pilot hole 23 or from anatomical landmarks using the surgeon's personal knowledge and/or experience.

As the active instrument 124 may be used to create the pilot hole 21, the controller 200 may overlay (or utilize other types of data presentations) the real time orientation/trajectory of the active instrument 124 with the modeled pilot hole 23 orientation/trajectory in real time. For example, as shown in FIG. 8, the controller 200 may display a cross section of the patient's vertebrae taken along the axial plane with the actual axial angle $\alpha_a$ of the active instrument 124 (shown as the dashed line C) overlaid with the modeled axial angle $\alpha_m$ of the modeled pilot hole 23 (the solid line 23), each taken with respect to the vertical axis S (e.g., the plumb line along the mid-sagittal plane). Other reference planes and/or coordinate systems may also be used as a reference.

Using this information, along with the starting point information for the pilot hole 23, the surgeon may manipulate the active instrument 124 during the drilling procedure such that the instrument's orientation/trajectory may match that of the modeled pilot hole 23. This may result in a properly aligned pilot hole 21 in the patient's spine that may generally match that of the modeled hole 23.

Figure 9:
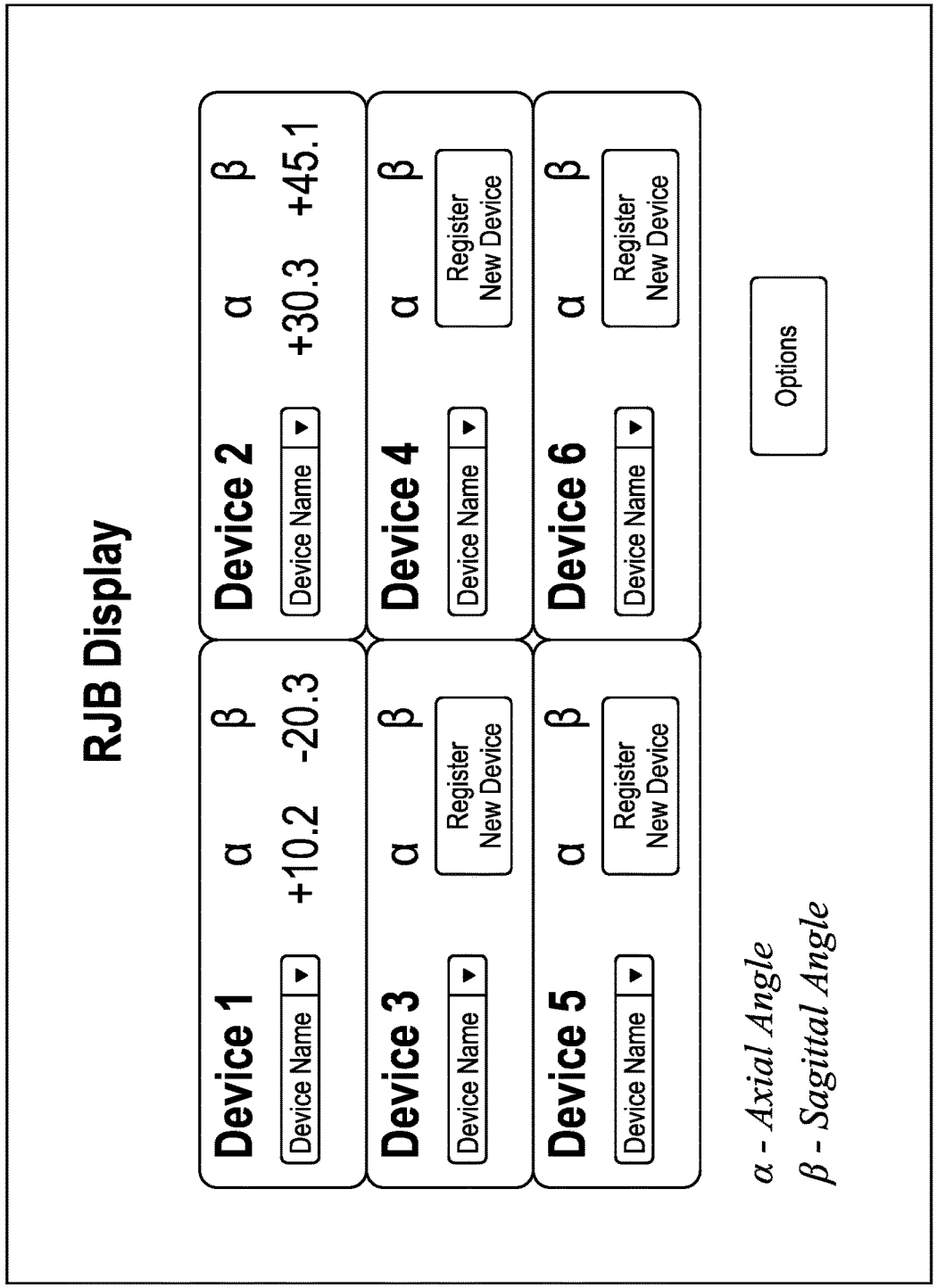

In another example as shown in FIG. 9, the controller 200 may display the angle information ($\alpha$ and $\beta$) measured by each measurement assembly 100 directly. In this way, the user may read the angles and manipulate the corresponding active instrument 124 accordingly.

FIG. 9 shows the angle information (α and β) for six individual measurement assemblies 100 configured with the system 10. Because each measurement assembly 100 may be configured with a different active instrument 124, the controller may display the name of the active instrument 124 along with each instrument's corresponding angular information. Other information may also be displayed. While FIG. 9 depicts positional data of six measurement assemblies 100 displayed by the controller 200, any number of measurement assemblies 100 may be configured with the system 10, and the controller 200 may display information received from any number of them.

In addition, the controller 200 may provide software wizards and/or any other types of interactive tools that may assist or otherwise guide the surgeon during the procedure.

The controller 200 may also provide other types of real time feedback to the surgeon such as warnings, e.g., if the alignment of the active instrument 124 may deviate from that of the modeled pilot hole 23 by a particular threshold. For example, if the angular orientation of the active instrument 124 may be deemed to be deviating from the modeled angular orientation of the pilot hole 23 along any plane beyond a pre-determined threshold, an audible warning may sound to alert the user. Other types of feedback and warnings such as visual, sensory, or any other type of feedback or any combination thereof may also be used.

The controller 200 may include at least one display 202 that may be easily viewable by the user of the system 10. For example, the display 202 may be positioned such that the surgeon may simply glance upward slightly in order to view the display 202 and the feedback that it may show. In another example, the display 202 of the controller 200 may be embedded into the eye glasses of the user so that the user may view both the display 202 and the patient at the same time. It is understood that the display(s) 202 may be preferably positioned anywhere where they may be viewed by at least some of the users of the system 10.

The surgeon need not be required to utilize all of the information provided by the system 10 during any particular surgery. For example, the surgeon may determine the entry point of a pilot hole 21 based on cortical landmarks and then utilize the orientation and trajectory information provided by the system 10 to bore the pilot hole 21. It is understood that some, any and/or all of the information provided by the system 10 may be utilized by the surgeon at the surgeon's discretion, and that the scope of the system 10 is not limited in any way by the information provided that the surgeon may or may not utilize.

It is understood by a person of ordinary skill in the art, upon reading this specification, that the above example describing the active instrument 124 as an awl 118 is meant for demonstration purposes, and that the active instrument 124 may be any type of instrument 117.

Figure 10:
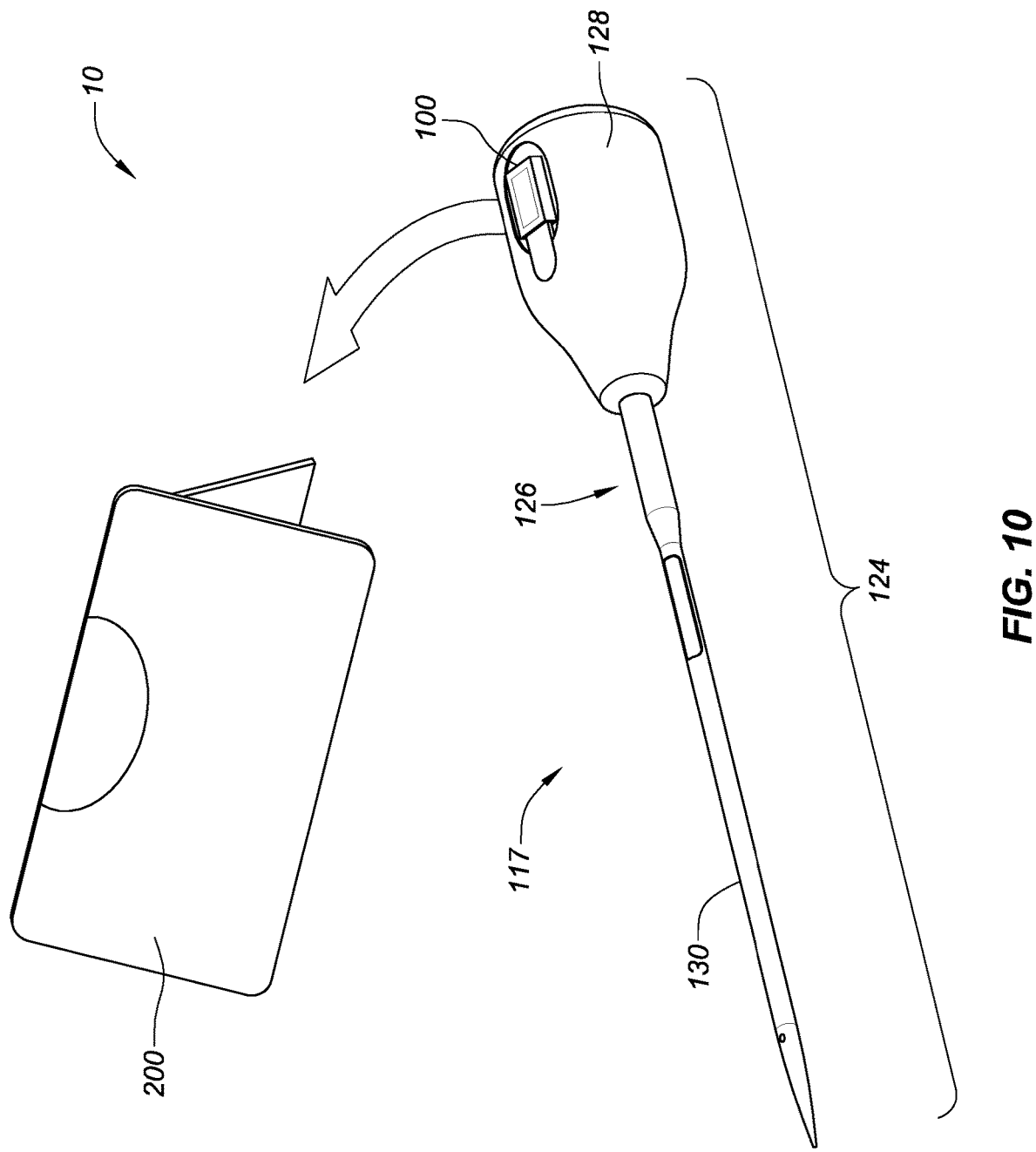
FIGS. 10-12 show aspects of an active instrument according to exemplary embodiments hereof.

For example, the instrument 117 may be a probe 126 as shown in FIG. 10.

The probe 126 may include a handle 128 and a shaft 130. A measurement assembly 100 may be configured with the probe 126 (with its handle 128 or elsewhere) such that the probe 128 may be an active instrument 124.

In one preferred implementation, the probe 126 may be used to measure the angular orientation and trajectory of the bored pilot hole 21 described above. The probe 126 may be inserted into the bored pilot hole 21 and the angular orientation and trajectory of the probe 126 (and thus that of the pilot hole 21) may be measured, processed and displayed by the system 10. In this way, the angular orientation and trajectory of the pilot hole 21 may be verified as adequately correlating with the modeled pilot hole 23 as described in previous sections.

Figure 11:
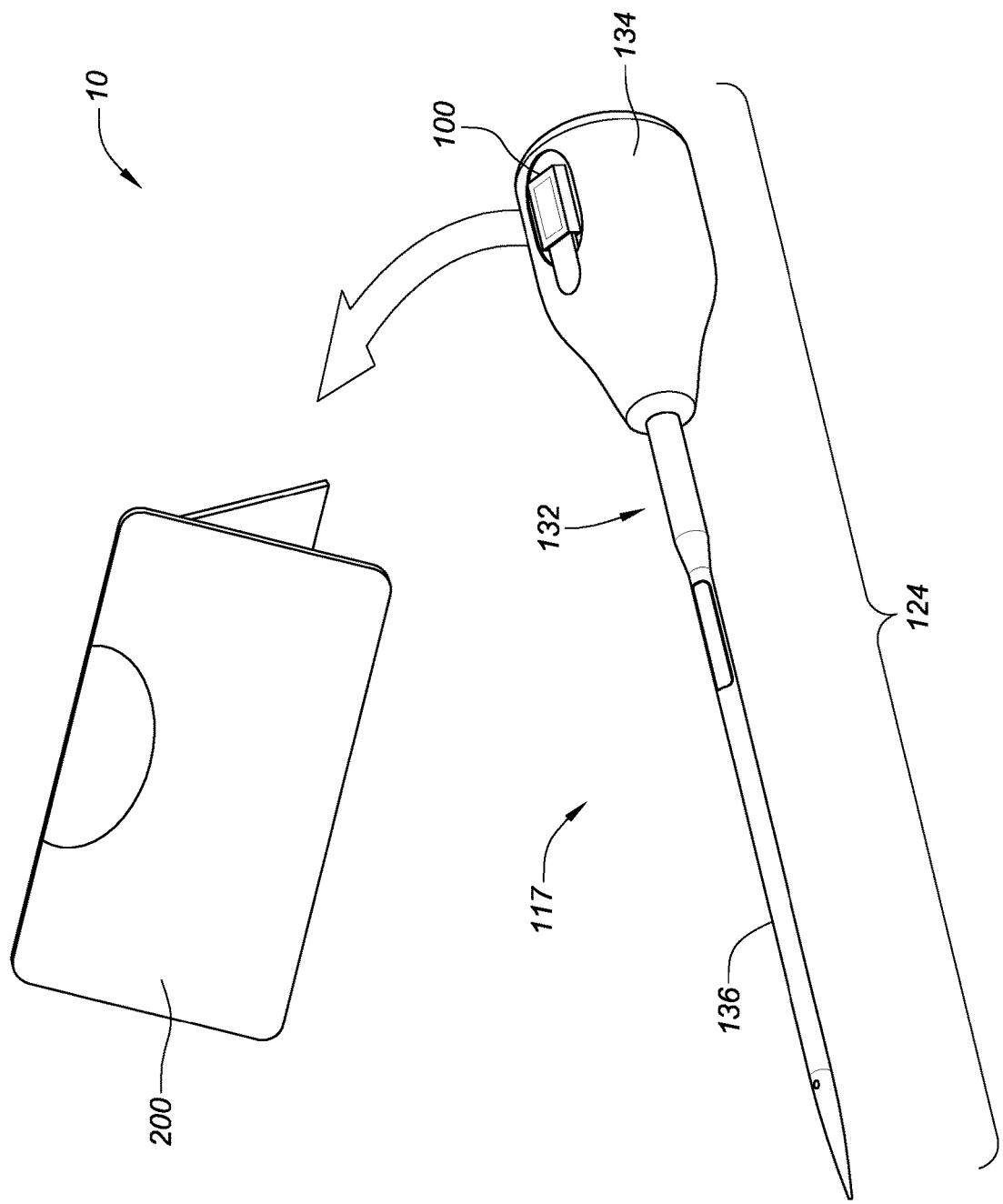

In another example as shown in FIG. 11, the instrument 117 may be a driver 132 (e.g., a screw driver) that may be used to screw each pedicle screw 20 into its corresponding pilot hole 21. The driver 132 may include a handle 134 and a shaft 136. A measurement assembly 100 may be configured with the driver 132 (e.g., with its handle 134) such that the driver 132 may be an active instrument 124. In this way, the trajectory of the screw 20 during its insertion may be monitored to match that of the modeled pilot hole 23 (and the actual pilot hole 21). This may ensure that the pedicle screw 20 may not pursue an alternate track outside the pilot hole 21 during its insertion.

Figure 12:
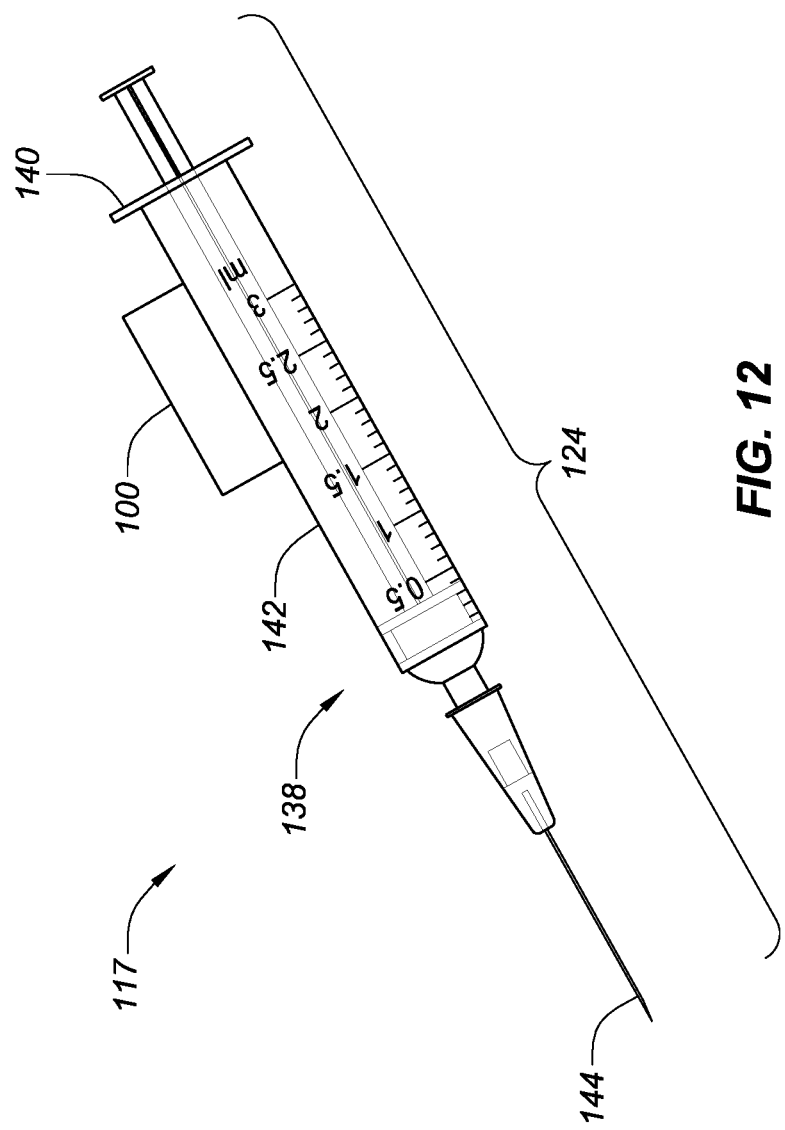

In another preferred implementation, the instrument 117 may be a hypodermic needle 138 as shown in FIG. 12. The hypodermic needle 138 may include a handle 140, a body 142 and a needle 144. A measurement assembly 100 may be configured with the hypodermic needle 132 (with its body 136 or elsewhere) such that the hypodermic needle may be an active instrument 124.

In one preferred implementation, the hypodermic needle 132 may be used to make an injection into the body of a patient. In some such procedures, it may be required that the orientation of the needle 138 be held at a particular angle in order to properly perform the injection. This may also apply to the embodiment discussed below in connection with a Jamshidi needle. As an active instrument 124, the system 10 may measure, process and display the real time angular orientation of the hypodermic needle 132 such that the surgeon may manipulate it to the preferred position.

In this example, the system 10 may or may not use imaging information of the patient, and may instead use theoretical modelled data to guide the user through the procedure. Alternatively, the user may simply use the positional data provided by the system 10 and manipulate the active instrument 124 with respect to a known reference coordinate system (e.g., a vertical plumb line).

While the system 10, including the measurement assembly 100 and the controller 200, has been described above with reference to surgical procedures such as spinal stabilization surgery and injections using a hypodermic needle, other types of surgical procedures may also benefit from the use of the system 10. For example, kyphoplasty, percutaneous bone biopsies of a known lesion within a bone, neurosurgical procedures within the brain that may require stereotactic surgery, as well as other surgical procedures, may also be used with, and benefit from, the system 10.

In all of the embodiments disclosed or otherwise, the measurement assembly 100 and/or the active instrument 124 may be disposable and may be designed to be used once and then discarded. Alternatively, the measurement assembly 100 and/or the active instrument 124 may be designed to be used multiple times.

In addition, in all of the embodiments disclosed or otherwise, it may be preferable that the measurement assembly 100 and/or the active instrument 124 be sterilized and/or otherwise be provided as a sterile device.

In another exemplary embodiment hereof, the measurement assembly 100 (also referred to as a measurement sensor) may be configured with a Jamshidi needle to be used in combination with the controller 200. This embodiment also illustrates another manner in which the measurement assembly 100 may be attached to the handle 120 in the embodiments above. While this embodiment is described in connection with a Jamshidi needle, it should be noted that aspects of this embodiment may apply to the embodiments above.

A standard Jamshidi needle is a manual device used to perform a variety of medical procedures including bone marrow biopsies (also referred to as trephine biopsies) and bone marrow aspirations. The tool may also be used during certain types of minimally invasive spine surgery such as Kyphoplasty, Vertebralplasty and/or other types of vertebral augmentation. The needle may also be used for other procedures.

Figure 13:
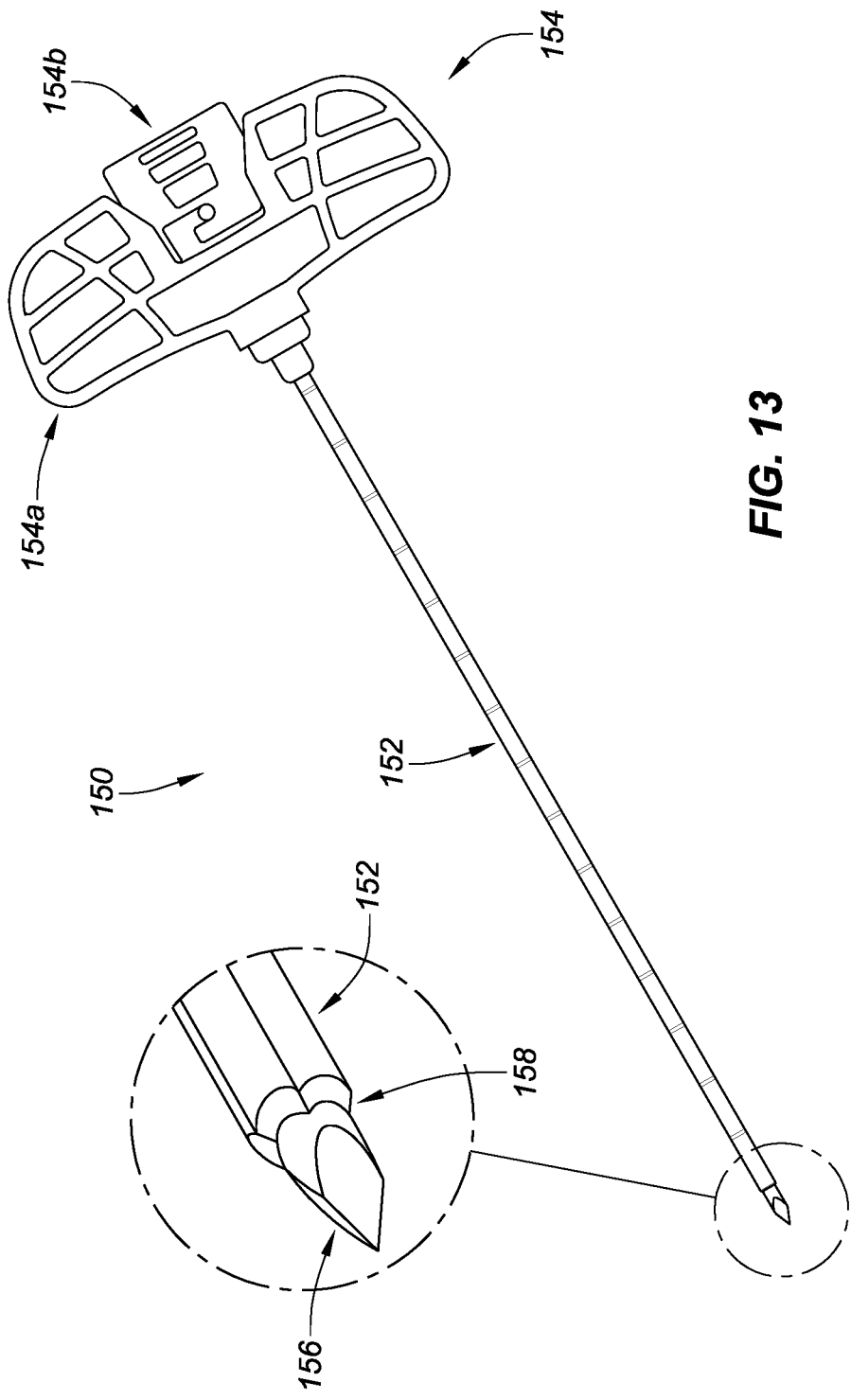
FIGS. 13-15 show a Jamshidi needle instrument.
Figure 14:
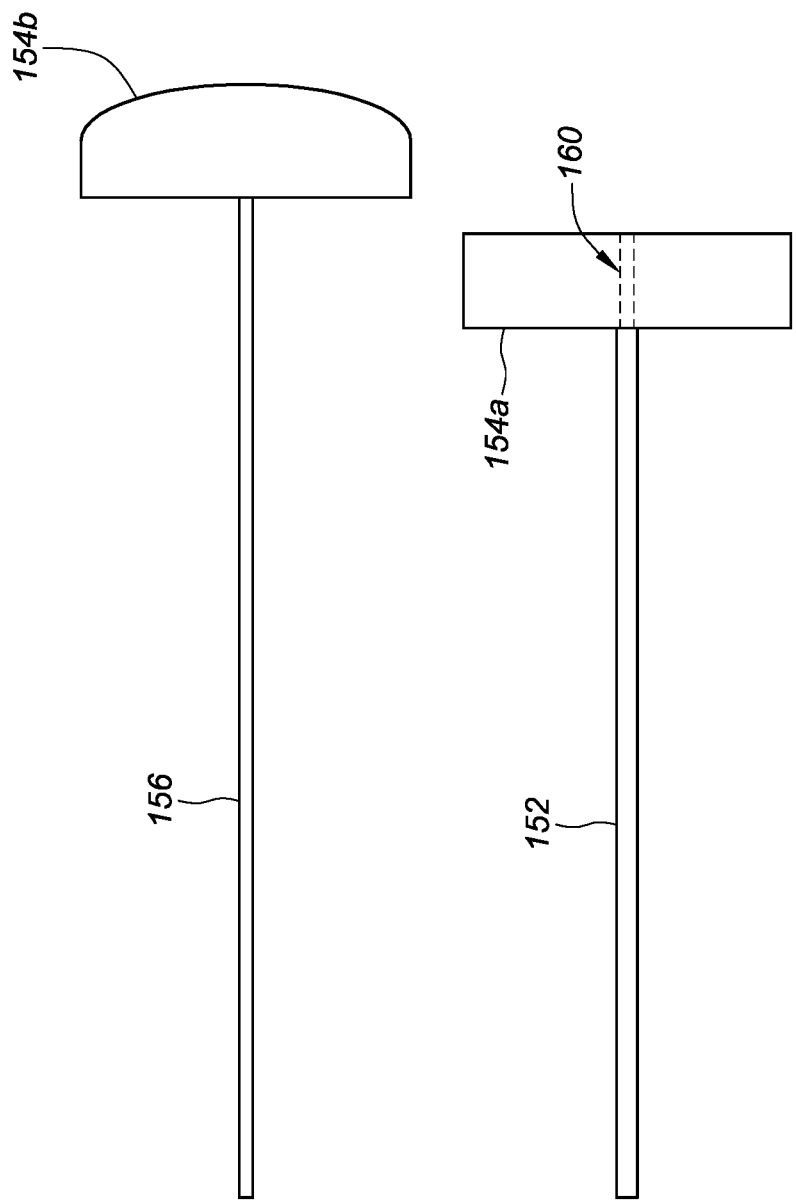
Figure 15:
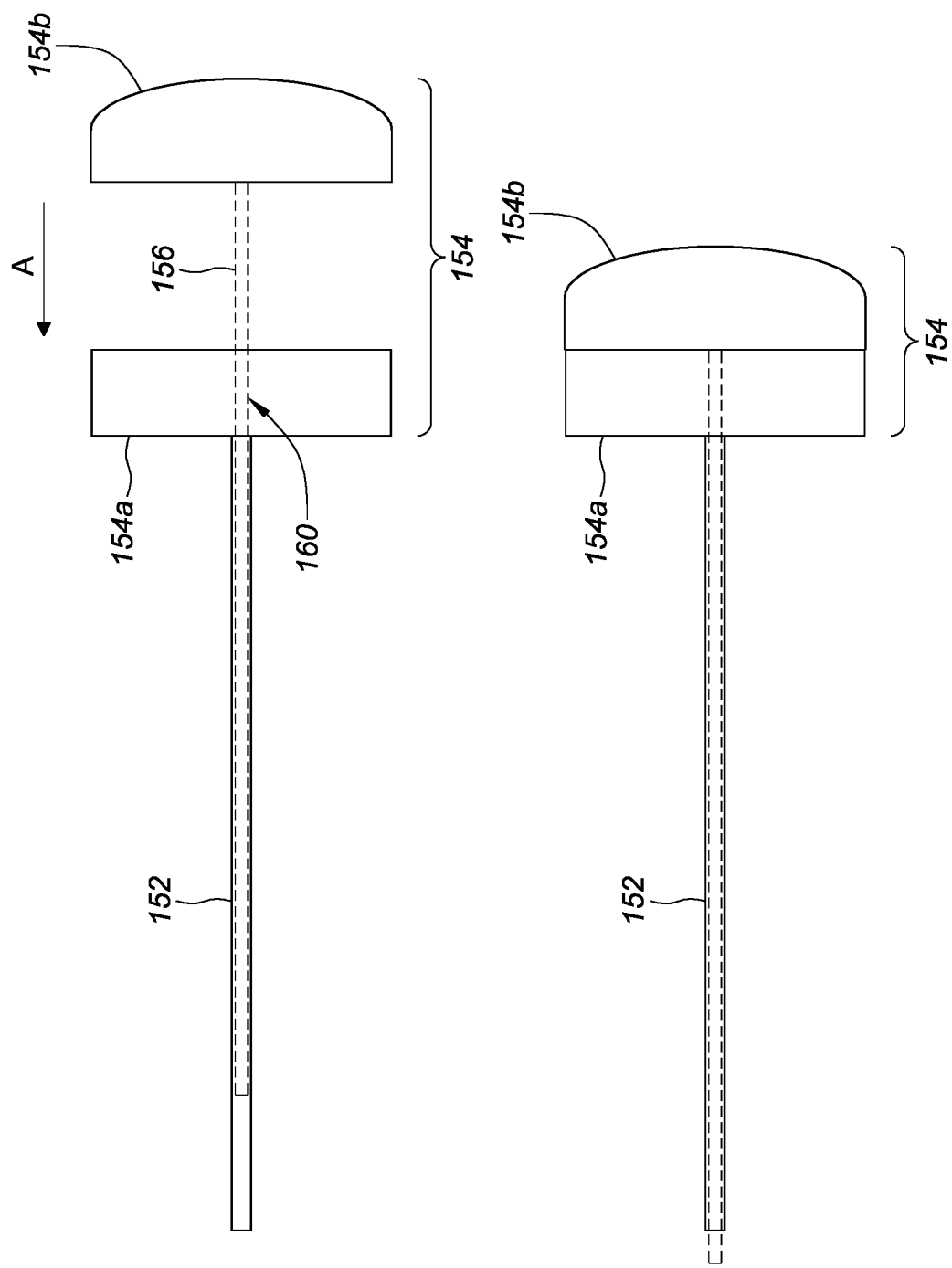

As shown in FIGS. 13-15, the Jamshidi needle 150 may include a cannula 152, a handle 154 and a stylet 156. The cannula 152 is a hollow needle comprised of stainless-steel or other appropriate materials. The distal end of the cannula 152 may be sharpened to form a cutting edge 158. For example, the inner diameter of the cannula 152 at its distal end may taper radially towards the tip to create a tapered cutting edge 158. The cutting edge 158 may be formed using other architectures and may vary depending on the needle's application.

The stylet 156 is a solid stainless-steel rod that may be secured within the entire length of the cannula 152 to provide strength and rigidity to the cannula 152 during use. Accordingly, the outer diameter of the stylet 156 may be slightly smaller than the inner diameter of the cannula 152 so that it may fit within the cannula 152. The distal end of the stylet 156 may also be sharpened. FIG. 13 depicts a standard Jamshidi needle 150 with the stylet 156 configured within the cannula 152 and protruding slightly out the cannula's distal end.

The handle 154 may include a front portion 154a and a detachable back portion 154b. When combined as shown in FIGS. 13 and 15, the front portion 154a and back portion 154b may preferably form a "T" handle. As shown in FIG. 14, the proximal end of the cannula 152 may be secured to the front portion 154a of the handle 154 and the cannula 152 may extend distally forward. A longitudinal opening 160 within the front portion 154a of the handle 154 may extend from the proximal end of the cannula 152 (where it may be connected to the front portion 154a) through and out the back of the front portion 154a. The opening may have approximately the same inner diameter as the cannula 152 and may extend continuously from the back of the front portion 154a of the handle 154 to the opening of the cannula 152 at its proximal end. The cannula 152 may be overmolded with the front portion 154a or secured by other attachment methods.

The back of the front portion 154a of the handle 154 may also include a Luer-lock fitting for the securement of a hypodermic needle (used for certain procedures such as bone marrow aspirations). The opening 160 may pass through the fitting and fitting may fit into a recess in the back portion 154b of the handle when the front and back portions 154a, 154b are connected.

The proximal end of the stylet 156 may be attached to the front of the back portion 154b and the stylet 156 may extend distally forward. As shown in FIG. 15, to configure the Jamshidi handle 150 and handle 154, the distal end of the stylet 156 may be inserted into the opening 160 and pushed into the cannula 152 in the direction of arrow A. When the back portion 154b may be attached to the front portion 154a, the stylet 156 may extend through the opening 160 in the back of the front portion 154a and into the cannula 152. The back portion 154b may be secured to the front portion 160 by attachment slots (e.g., quarter-turn attachment slots) or by any other suitable detachable attachment mechanisms.

The distal end of the stylet 156 may be sharpened and when inserted as described above may protrude slightly from the distal tip 158 of the cannula 152 (e.g., by a few thousandths of an inch) to provide a drilling point for penetrating through bone.

In a typical use, once the bone is penetrated, the stylet 156 may be removed from the cannula 152 by removing the back portion 154b of the handle 154. The cannula 152 (now being hollow with the stylet 156 removed) may then be used to extract bone marrow (solid or liquid), to deploy bone tamps (orthopaedic balloons) and/or bone cement into damaged vertebrae, and for other procedures.

In an embodiment hereof as shown in FIGS. 16-22, the handle 300 may be adapted to receive and secure the measurement assembly 100. The combination of the handle 300 and the measurement assembly 100 may form an active handle 302. The combination of the active handle 302, the cannula 152 and the stylet 156 may form an active Jamshidi needle 304. The active Jamshidi needle 304 may then be used in combination with the controller 200 to form the system 10 (similar to the embodiments described above or for other purposes).

The measurement assembly 100 may be attached to or otherwise configured with the handle 300 during the manufacturing process of the instrument or may be retrofitted with the instrument as an after-market component. In either case, the measurement assembly 100 may be removably attached to the handle 300, so that the assembly 100 may be removed and attached to a different instrument as needed. Alternatively, the measurement assembly 100 may be permanently attached the handle 300. The measurement assembly 100 may be single-use, disposable; or alternatively may be suitable for multiple uses and may be sterilized for such multiple uses.

Figure 16:
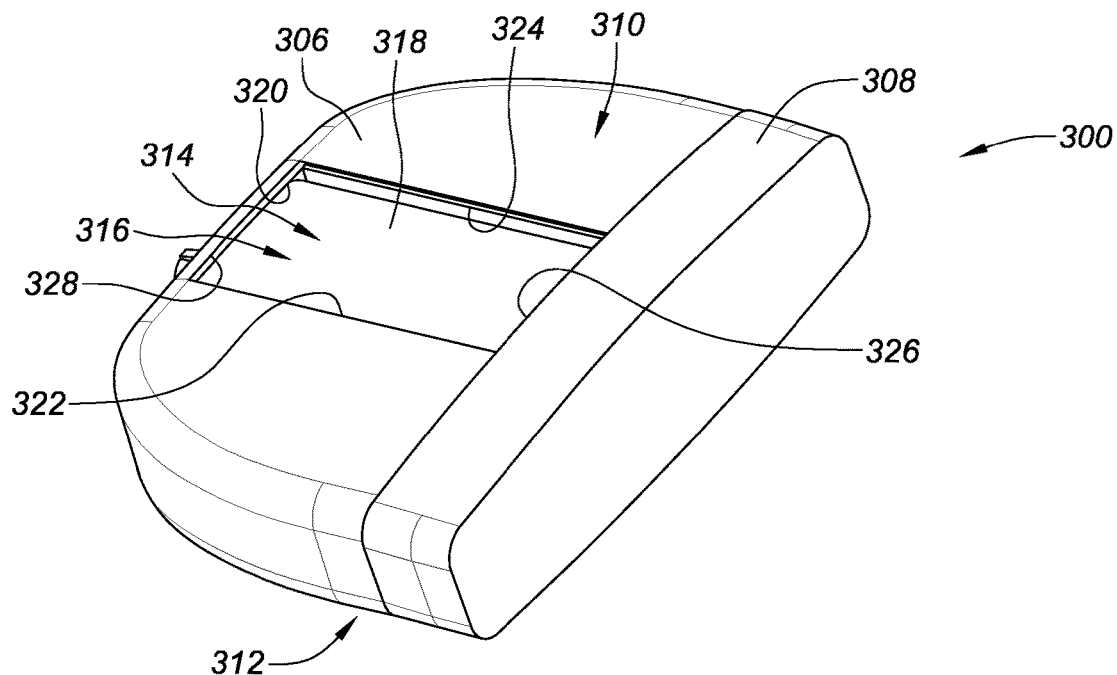
FIGS. 16-23 show an embodiment of an active instrument including an improved Jamshidi needle.
Figure 17:
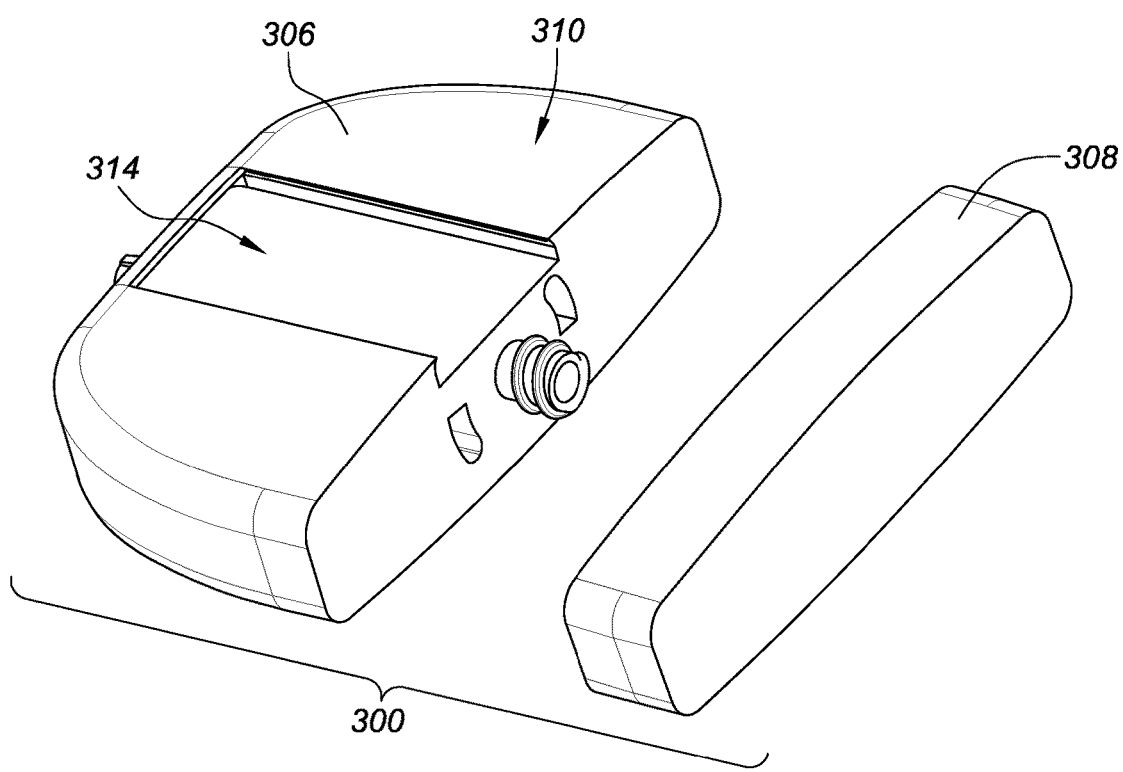

The handle 300 may include a front portion 306 and a back portion 308 that may be attached and detached from one another (FIGS. 16-17). The handle 300 may also include a top 310 and a bottom 312. The top 310 (or the bottom 312) may include an attachment area 314 that may be adapted to receive the measurement assembly 100. As discussed later, in a preferred embodiment, the back portion 308 may be removed from the front portion 306 thereby providing access for to the attachment area 314 for the assembly 100. The measurement assembly 100 may be longitudinally aligned with the axis defined by the cannula 152 so that the coordinate system used by the measurement assembly 100 may be aligned with that of the active Jamshidi needle 304. The front and back portions, 306, 308 may then be reattached.

Figure 20:
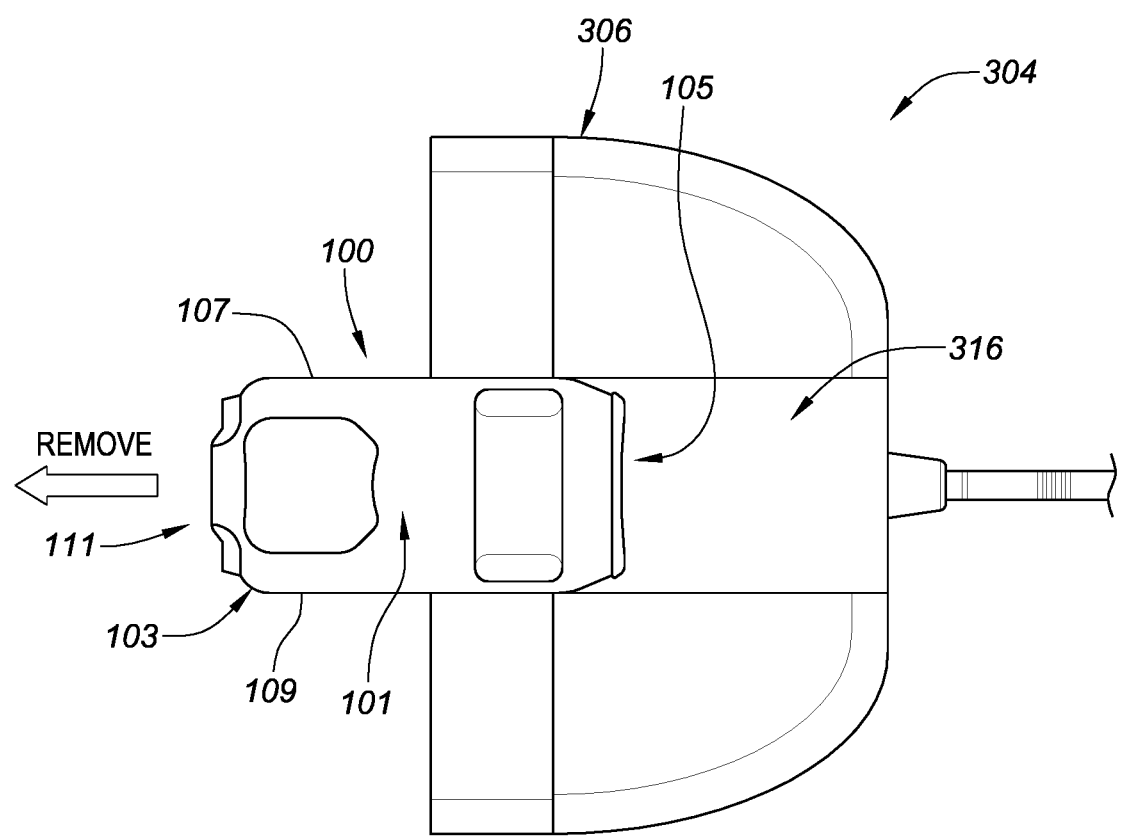

The measurement assembly 100 may include a top 101, a bottom 103, a front 105, a left side 107, a right side 109 and a back 111 (see FIG. 20)

Figure 18:
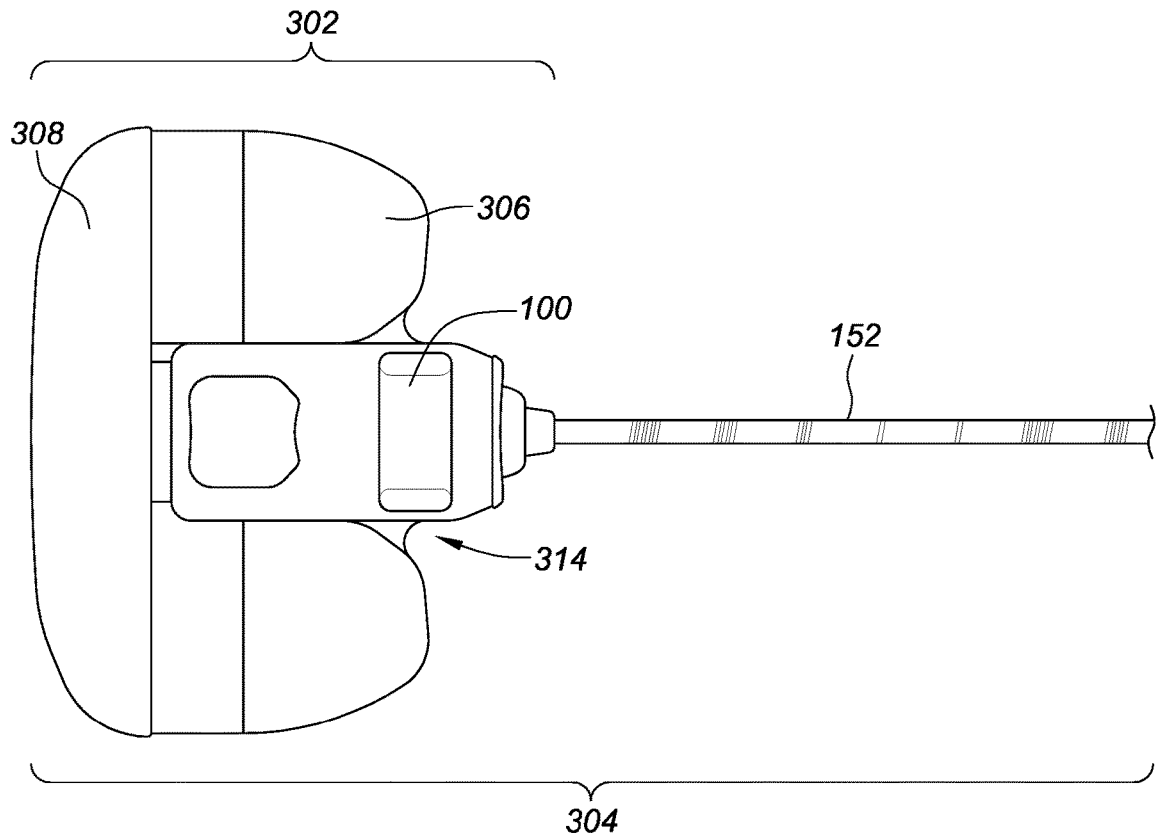

In a preferred embodiment, the attachment area 314 may include a recess 316. The recess 316 may include a bottom 318, a front 320, a left side 322, a right side 324 and a back 326. The recess 316 may be sized to generally correspond to the footprint or dimensions of the measurement assembly 100 so that the measurement assembly 100 may be received into the recess 316 and secured therein as shown in FIG. 18.

It is preferred that the measurement assembly's bottom 103, front 105, left side 107, right side 109 and back 111 generally abut against the recess's bottom 318, front 320, left side 322, right side 324 and back 326, respectively. In this way, the measurement assembly 100 may fit snugly within the recess 316 to facilitate accurate alignment data with respect to the axis of the Jamshidi needle. However, the recess 316 need not necessarily include all of a bottom 318, a front 320, a left side 322, a right side 324 and a back 326. For example, the recess 316 may not necessarily include a back 326 in which case the back of the recess 316 may be open, and assembly 100 may still be secured within attachment area 314 by back portion 308 is reattached to front portion 306.

The depth of the recess 316 may be constant across the length and/or width of the recess 316 or the depth may vary in any way. In any event, the depth of the recess 316 may be such that at least some of the recess's front 320, left side 322, right side 324 and/or back 326 may extend above the bottom 103 of the measurement assembly 100. In some embodiments at least some of the recess's front 320, left side 322, right side 324 and/or back 326 may extend above the top 101 of the measurement assembly 100. In addition, the bottom 318 of the recess 316 may be generally flat and continual across the length and width of the recess 316 so that the measurement assembly 100 may lie flat within the recess 316 and be supported thereby. Alternatively, the bottom 318 may include gaps or spaces between areas that may provide support to the measurement assembly 100. In either case, the bottom 318 preferably provides adequate support and stability to the measurement assembly 100 such that the assembly 100 may rest flat and be stable.

The measurement assembly 100 may be secured within the recess 316 by pressure fit created by the abutment of at least some of the measurement assembly's bottom 103, front 105, left side 107, right side 109 and back 111 against at least some of the recess's bottom 318, front 320, left side 322, right side 324 and back 326, respectively. However, the measurement assembly 100 may initially fit loosely in the recess 316 to facilitate placing it in attachment area 114, but may be adequately secured using other attachment mechanisms and/or methods (e.g., adhesive or double-sided tape) as described in other sections.

Figure 19:
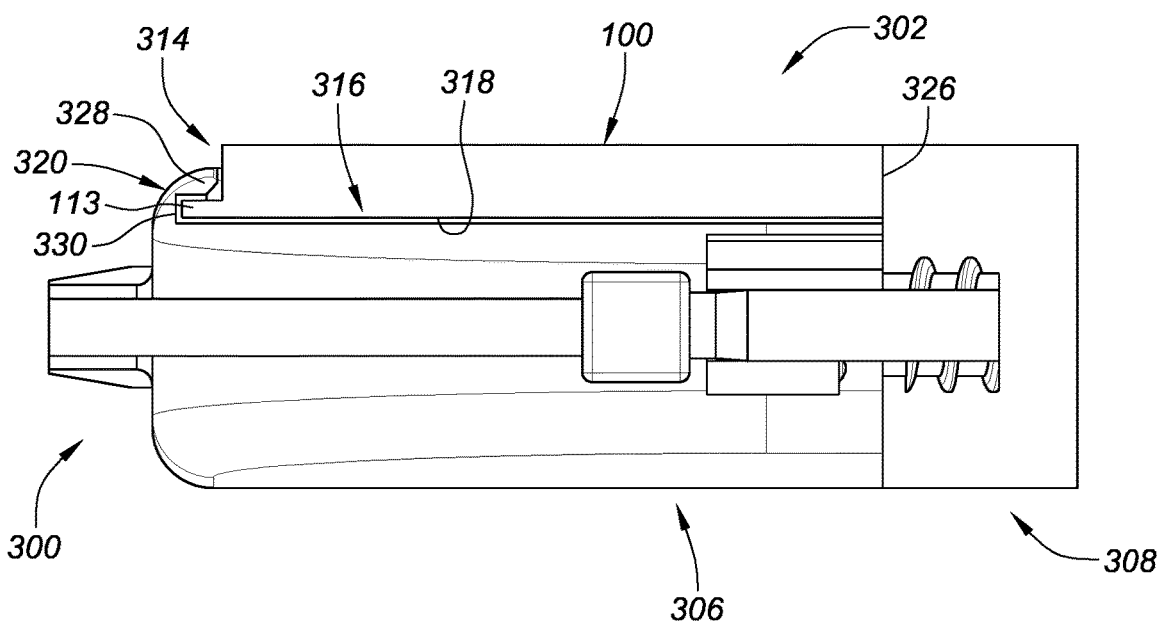

As shown in FIG. 19, the front 320 of the recess 316 may include an upper lip 328 that may form a slot 330 between the upper lip 328 and the bottom 318 of the recess 316. The measurement assembly 100 may include a front protrusion 113 that may extend (at least partially) into the slot 330 when the measurement assembly 100 is positioned within the recess 316 as described above. The upper lip 328 may thereby hold the protrusion 113 within the slot 330 to further secure the measurement assembly 100 within the recess 316.

The slot 330 may also be used to properly align the measurement assembly 100 within the recess 316 as will be described in other sections. While the lip 328 has been described as a single lip 328, it is understood that the lip 328 may comprise multiple lips 328 arranged to secure the measurement assembly 100. It is also understood that while the lip 328 has been depicted as being located in the front 320 of the recess 316, the lip(s) 328 may be positioned in any areas of the recess 316 (e.g., on the sides 322, 324).

The recess 316 may include contoured sides 322 and/or 324 that may correspond to the cross-sectional shape or dimensions of the measurement assembly's sides 107, 109. In this case, as shown in FIG. 20, the measurement assembly 100 may be slid into the recess (e.g., from the back while the back portion 308 is removed) and the contoured sides 322 and/or 324 may hold the sides 107, 109. It is preferred that the fit be snug so that the sides 322 and/or 324 engage the sides 107, 109 to secure the measurement assembly 100 within the recess 316. However, other attachment mechanisms (e.g., adhesive) may also be included. FIG. 20 shows handle 300 with the back portion 308 removed from the front portion 306. When portions 306, 308 are reattached, back portion, 308 may help further secure assembly 100.

Figure 21:
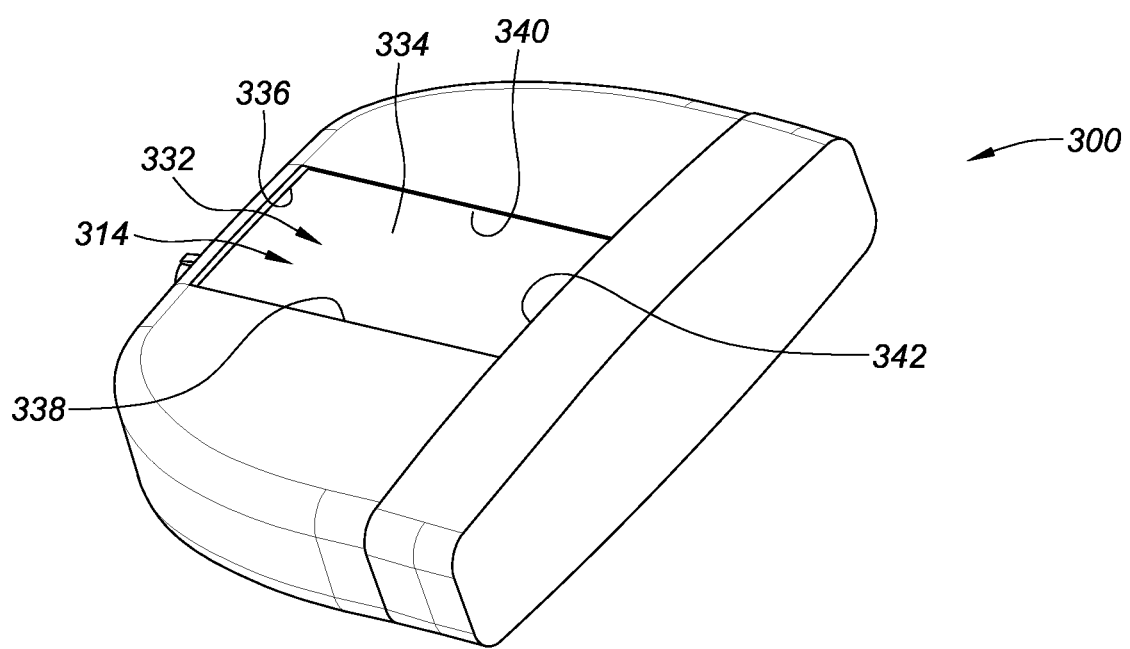

In another preferred embodiment hereof, the attachment area 314 may include a surface 332 as shown in FIG. 21. The surface 332 may preferably include a top 334, a front 336, a left side 338, a right side 340 and a back 342. The surface 332 may be sized to generally correspond to the footprint or dimensions of the measurement assembly 100 so that the measurement assembly 100 may be received by the surface 332 and attached thereto.

Figure 22:
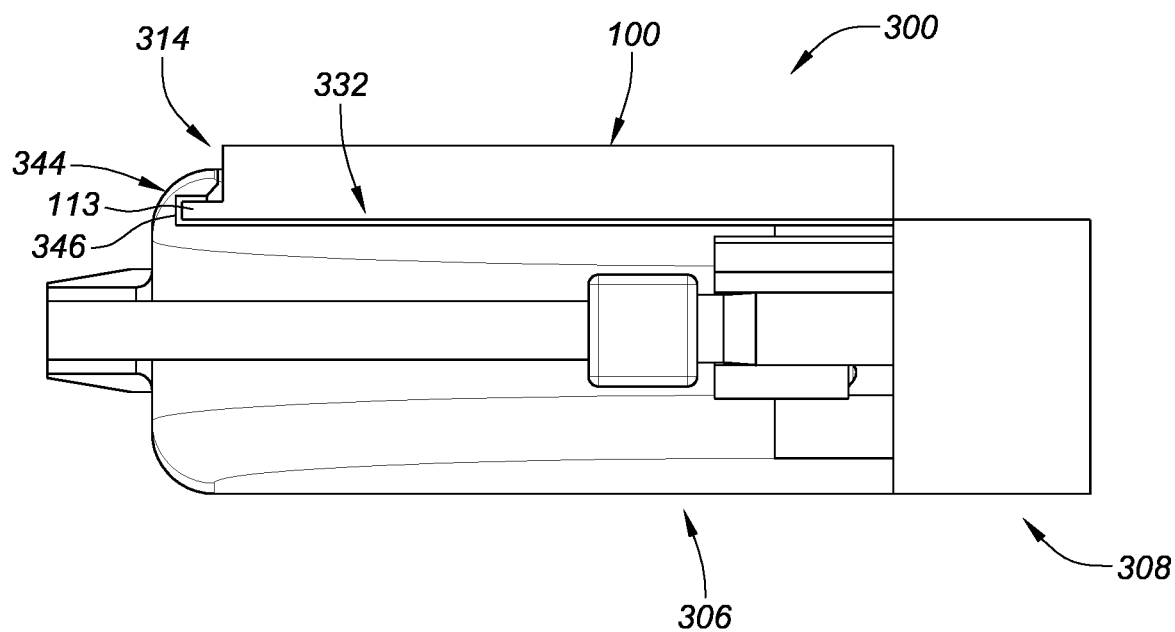

As shown in FIG. 22, the front 336 of the surface 332 may include a raised portion 344 that may include a notch 346. The measurement assembly 100 may include a front protrusion 113 that may extend (at least partially) into the notch 346 when the measurement assembly 100 is positioned on the surface 332 as described above. The notch 346 may thereby hold the protrusion 113 to further secure the measurement assembly 100 on the surface 332. The notch 346 may also be used to properly align the measurement assembly 100 on the surface 332 as will be described in other sections. While the notch 346 has been described as a single notch 346, it is understood that the notch 346 may comprise multiple notches 346 arranged to secure the measurement assembly 100. It is also understood that while notch 346 has been depicted as being located in the front 336 of the recess 332, the notch(es) 346 may be positioned in any areas of the surface 332 (e.g., on the sides 336, 338).

In this embodiment, the measurement assembly 100 may be positioned and/or removed from the handle 300 without detachment of the front and back portions 306, 308, though detachment of portions 306, 308 may still occur.

Figure 23:
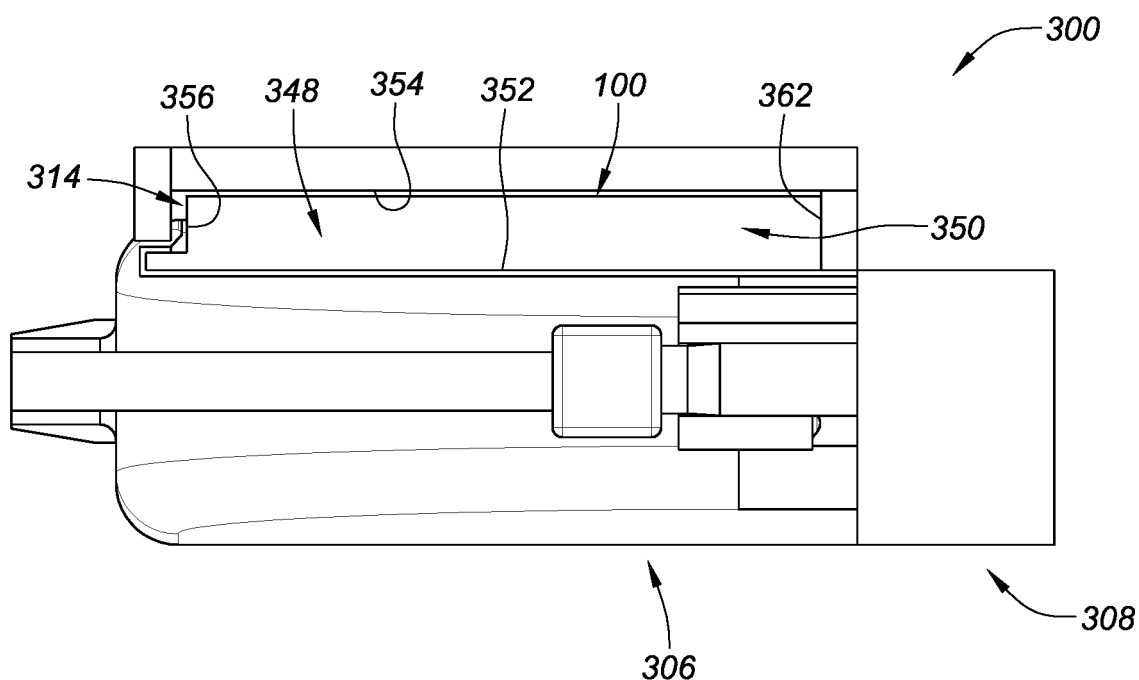

In another preferred embodiment as shown in FIG. 23, the attachment area 314 may include a cavity 348. The cavity 348 may include an inner volume 350 defined by a bottom 352, a top 354, a front 356, a left side 358, a right side 360 and a back 362. The size and shape of the cavity's inner volume 350 may generally correspond to the size and shape body of the measurement assembly 100 so that the measurement assembly 100 may be received into the inner volume 350 and attached therein.

The cavity 348 may include a removable lid or other portion that when removed (at least partially) may allow for the insertion and/or removal of the measurement assembly 100 into the cavity 348. Alternatively, the cavity 348 may include one or more openings through which the measurement assembly 100 may be inserted through and into the cavity 348. For example, the cavity 348 may include an opening at its back that may be exposed by removing the back portion 308 of the handle 300. In this case, with the back portion 308 detached from the front portion 306, the measurement assembly 100 may be inserted into the cavity 348 and/or removed from the cavity 348.

In this example, and generally in the other embodiments described herein, the measurement assembly 100 may remain secured on or within the front portion 306 of the handle 300 as required when the back portion 308 may be removed. For example, in some applications such as bone marrow aspirations, the back portion 308 may be removed and a hydremic needle may be attached to the exposed Luer lock fitting on the front portion 306, all while the measurement assembly 100 may remain intact.

In the embodiments described herein, the measurement assembly 100 may also be secured to the attachment area 314 (e.g., within the recess 316, on the surface 332 and/or within the cavity 348) using attachment mechanisms such as double-sided tape, adhesive, cement, hook and loop material, pressure fit, latches, straps, hooks, clips, screws, bolts, snaps, suction cups, detents and other types of attachment mechanisms and/or methods and any combination thereof.

To this end, the measurement assembly 100 may be secured to the attachment area 314 using any appropriate attachment mechanisms and/or methods, and that the scope of the system 10, the measurement assembly 100, the active handle 302 and/or the active Jamshidi needle 304 is not limited in any way by the way in which the measurement assembly 100 may be secured to the attachment area.

In any of the embodiments described herein, the handle 300 (front portion 306 and/or back portion 308), the cannula 152 and/or any other element of the active Jamshidi needle 304 may include alignment mechanisms to facilitate the proper alignment of the measurement assembly 100 with the needle 304. For example, the attachment area 314 may include alignment marks (e.g., at the front 320 of the recess 318, at the front 336 of the surface 332 and/or in other locations) that may line up with corresponding alignment marks on the measurement assembly 100. In another example, the attachment area 314 may include alignment detents (e.g., at the front 320 of the recess 318, at the front 336 of the surface 332 and/or in other locations) that may receive corresponding tabs on the measurement assembly 100. In this way, the measurement assembly 100 may be properly aligned (e.g., along the longitudinal axis of the Jamshidi needle 304) for calibration purposes.

In addition, while the embodiments disclosed herein describe the measurement assembly 100 as being attached to the top 310 of the handle 300, any other side or surface of the handle may include an attachment area 314, a recess 316, surface 332, a cavity 348 and/or any other point of attachment that may receive the measurement assembly 100.

Also, while the embodiments disclosed herein describe the measurement assembly 100 as being configured with the handle in a supine configuration (e.g., with its bottom surface 103 resting on the attachment area 314), the measurement assembly 100 may be oriented in any direction and that any surface of the measurement assembly 100 (e.g., its top 101, bottom 103, front 105, left side 107, right side 109 and/or back 111) may rest, be configured with or otherwise be in contact with the handle 300). The measurement assembly 100 may be configured with the cannula 152 or with any other part or element of the Jamshidi needle.

The attachment area 314 may include any combination of aspects from any of the embodiments described above or otherwise. For example, the attachment area 314 may include a combination of a recess 316 and a surface 332 wherein the surface 332 includes a recessed front and back but not recessed left and right sides. Some of the embodiments described above depict the attachment area 314 as being generally located on the top 310 of the handle 300, the attachment area 314 may be located anywhere on the handle 300 (e.g., on the bottom 312, on the left side, the right side, the back and/or in any other location.

Use Cases

I. Bone Marrow Aspiration and Biopsy

In a preferred embodiment hereof, the active Jamshidi needle 304 in combination with the controller 200 may be used for performing bone marrow aspiration and biopsy procedures.

Bone marrow is a soft tissue in the center of most large bones within the human body. It produces most of the body's blood cells. Bone marrow aspiration is the removal of a small amount of this tissue in liquid form for examination. A bone marrow biopsy involves removing a small sample of the dense bone marrow from inside a bone for testing. Bone marrow aspirations and biopsies are important tests in hematology, oncology and medicine, and are performed to help identify unexplained anemia (lack of red blood cells), abnormal numbers of blood cells (red blood cells, white blood cells, or platelets), lack of iron (iron deficiency), cancers of the blood-forming tissue (leukemia or lymphoma), cancers that may have spread to the bone marrow, a patient's response to chemotherapy and for other purposes.

Figure 24B:
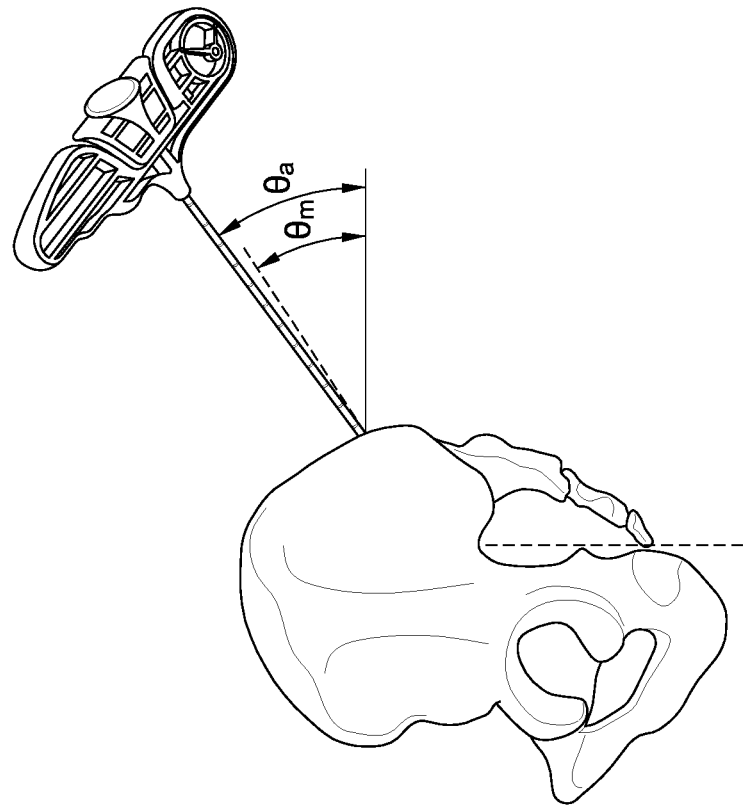
FIGS. 24A, 24B and 25 show the positioning of a Jamshidi needlue including the improved handle and alignment system of the current invention.
Figure 24A:
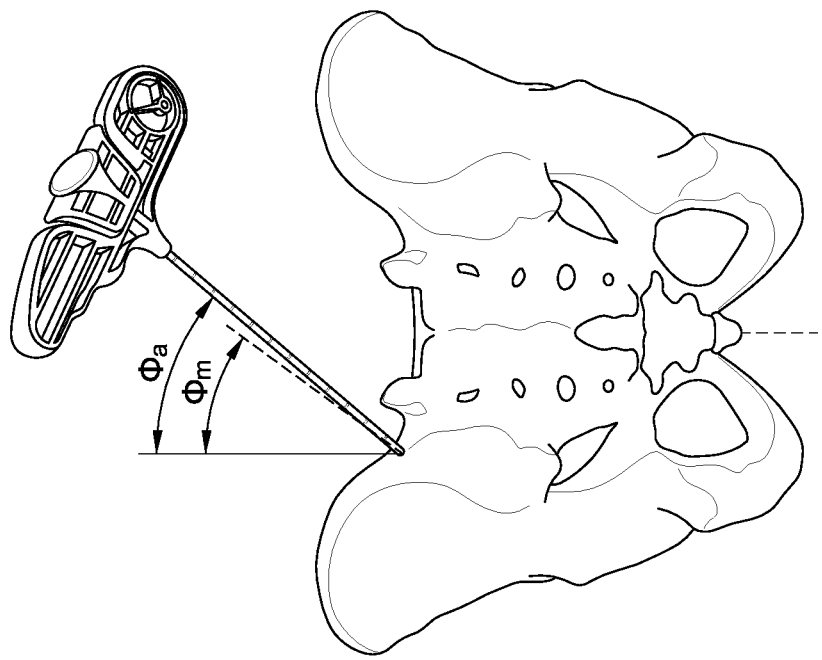
Figure 25:
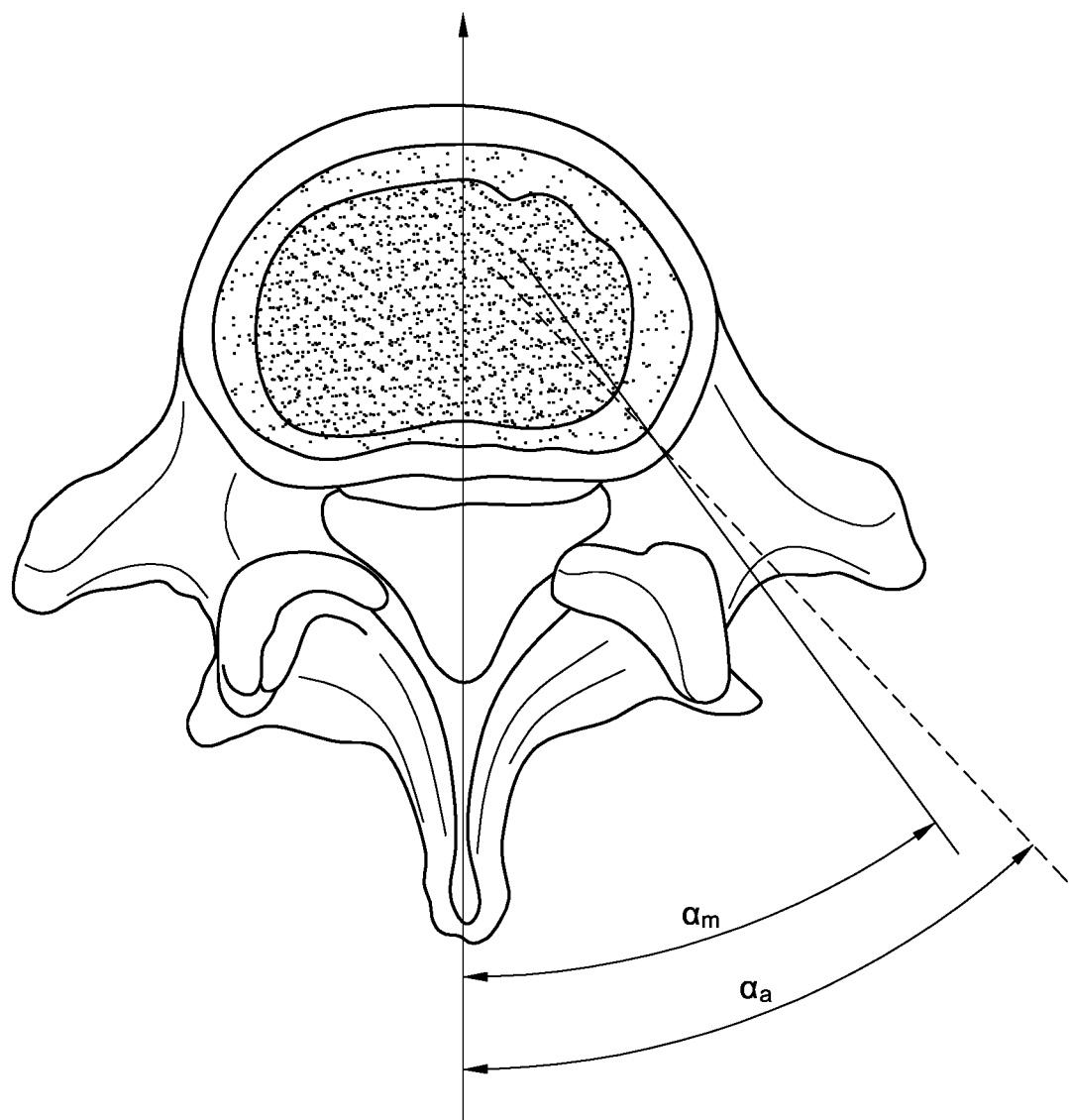

In many cases, a Jamshidi needle 150 (as shown in FIGS. 24A, 24B and 25) may be used and the bone marrow fluid (aspiration) and tissue sample (biopsy) may be collected from the top ridge of the back of the hipbone (the posterior superior iliac spine (PSIS)). Alternatively, the front of the hip (the anterior superior iliac spine (ASIS)) may be used. A standard procedure includes advancing the needle perpendicularly to reach the PSIS and penetrate the bone's outer cortex. Once the outer cortex is penetrated, the angle of the needle is reoriented, and the needle is advanced further into the bone. The reorientation of the needle is a delicate procedure and, as is known in the art, there are currently two common approaches: 1) the Umbilicus (Medial Approach), and 2) the Ipsilateral ASIS (Lateral Approach).

The Medial Approach involves changing the angle of the needle after penetration of the exterior cortex to point towards the umbilicus, while the Lateral Approach involves changing the direction of the needle to point towards the ASIS. In either approach, the needle must not penetrate the inner core of the bone's cortex, as this may cause injury to the sacro-iliac joint, femoral nerve, common iliac vessels and mesentery of the sigmoid colon. In addition, when using the Medial Approach, the needle may be in close proximity to the iliolumbar vein and artery and the lumbosacral trunk, and when using the Lateral Approach, the needle may be in close proximity to the iliacus muscle and the lateral cutaneous branch of the femoral nerve. Contacting any of these structures is highly undesirable as it may cause neurovascular injuries, retroperitoneal and/or and intraperitoneal hemorrhaging, hematoma formation, pseudo aneurysm formation, gluteal compartment syndrome, excessive bleeding and other issues.

During this procedure, a small incision may be made in the patient and the cannula 152 may be inserted. The cannula 152 may be carefully maneuvered through the flesh until contact is made with the bone's surface. Once it has been determined that the stylet tip is securely situated on the bone at the desired location, pressure is applied to the needle, and with a back-and-forth rotation of the wrist and forearm, the stylet 156 is drilled into the bone.

When the cannula/stylet combination has penetrated the outer cortex of the bone, the needle may be reoriented (e.g., using the Medial Approach, the Lateral Approach or another suitable approach) and the needle may be inserted to the desired depth. The stylet 156 may then be removed (e.g., by removing the back portion 154b of the handle 154) and a syringe may be attached to a Luer-type lock at the proximal end of the cannula 152. The syringe may be used to pull an aspirant sample from the marrow. After an aspirant sample is obtained, the syringe may be removed, and the back portion 154b (sans the stylet 156) may be reattached to the front portion 154a to cap the cannula 156. The cannula 156 may then be drilled further into the marrow to collect a hard marrow sample. Once a sufficient marrow sample has been obtained, the Jamshidi needle may be removed and a probe slightly longer than the stylet 156 may be used to gently push the sample out of the proximal end of the cannula 152 and into a sterile lab container.

The positioning, alignment and trajectory of the needle during the procedures is critical, and the standard use of anatomical markers, landmark palpation and/or imaging techniques to position and align the needle may be insufficient depending on the experience and skill level of the surgeon.

In a preferred embodiment, an active Jamshidi needle 304 and an associated controller 200 may be used for taking bone marrow aspirations and/or biopsies of the PSIS and/or ASIS. In general, the measurement assembly 100 may, in real time, measure the three-dimensional position, alignment, orientation and trajectory of the active Jamshidi needle 304, as described above in connection with the foregoing embodiments, and may provide this positional data to the controller 200. The controller 200 may then process the data and provide feedback (e.g., visual, textual, audible, etc.) to the surgeon regarding the trajectory of the needle 304.

An imaging instrumentation (e.g., C-arm fluoroscopic imaging instrumentation, CT scan, MRI, etc.) may be used to take sequences of images of the patient's hip region from different perspectives. The images may then be used to construct one, two and/or three-dimensional representations of the hip.

In another embodiment, two and/or three-dimensional theoretical representations (models) of the patient's hip may be simulated while considering the patient's sex, build, height, and various anatomical measurements.

In a preferred embodiment hereof, the controller 200 may use the imaging data and/or the theoretical representation of the patient's hip to model, calculate or otherwise determine the proper step-by-step (optimal) positions, alignments, angles, and trajectories (preferably in three-dimensions) that the needle 304 should take during the procedure. Alternatively, the controller may allow the user to interact with the controller 200 to lay out the proposed step-by-step positions, orientations and trajectories of the needle 304 manually. For example, the controller 200 may display the representations of the patient's hip and the user may draw (or otherwise input) the proposed positions, orientations and trajectories onto the layout that the needle 304 should take. In either case, the step-by-step positions of the needle 304 may correspond to a Medial Approach, a Lateral Approach or to another suitable approach.

The surgeon may then use the active Jamshidi needle 304 to perform the procedure, and the controller 200 may overlay the real time orientations and trajectories of the active needle 304 with the modeled orientations and trajectories for each step of the process. In this way, the system 10 may provide step-by-step guidance of the active needle 304 for its precise placement.

For example, the controller 200 may display a cross section of the patient's posterior iliac crest (PSIS) taken along the coronal (frontal) plane (FIG. 24A) and the sagittal plane (FIG. 24B). The actual angles of the active needle 304 lateral from the parasagittal plane ($\phi_a$ in FIG. 24A) and caudal ($\theta_a$ in FIG. 24B) may be overlaid with the modeled angles $\phi_m$ and $\theta_m$ of the modeled trajectories (the dashed lines) respectively.

Using this information, the surgeon may manipulate the active Jamshidi needle 304 during the aspiration and/or biopsy procedure such that the instrument's orientation and trajectory may match that of the modeled trajectory. Note that the display of the controller 200 may dynamically change in real time to provide immediate guidance for each step (and each potential realignment of the needle 304) of the procedure in real time. In this way, the surgeon may be guided from the onset to the successful completion of the procedure.

In other embodiments, the active Jamshidi needle 304 in combination with the controller 200 may be used to perform aspirations and/or biopsies in other areas of the body, such as within the spinal column. In such cases, the consequences of an improperly placed needle within the spinal column may be catastrophic and may result in neurological damage. In these situations, real time trajectory guidance of the needle with higher precision provided by the active needle 304 and the controller 200 is needed to reduce these dangers.

II. Vertebral Augmentation

In a preferred embodiment hereof, the active Jamshidi needle 304 in combination with the controller 200 may be used for performing minimally invasive spine surgeries such as Kyphoplasty and/or Vertebralplasty procedures. Kyphoplasty and Vertebralplasty are surgical procedures used to treat compression fractures of the spine. These fractures, also known as vertebral compression fractures (VCF) are typically caused by the natural effects of aging and osteoporosis.

Kyphoplasty involves inserting a Jamshidi needle through the patient's skin and into the fractured vertebra. There are several needle approaches used with Kyphoplasty including the lumbar transpedicular approach (the most common), the lumbar extrapedicular approach, the thoracic extrapedicular approach, the thoracic infrapedicular approach, and other approaches. With all approaches, extreme care must be taken to during the insertion of the needle. Using the lumbar transpedicular approach as an example, the needle must pass through the patient's pedicle without breaching and/or perforating the lateral cortical wall or the medial cortical wall as such breaches may cause significant neurological problems for the patient, including but not limited to, chronic pain, numbness, limited mobility and paralysis. The depth of the needle once inside the body of the vertebra must also be carefully monitored.

Once the needle is in place, a small inflatable bone tamp (orthopaedic balloon) may be inserted through the needle and into the damaged vertebrae. Once inserted, the tamp may be inflated to reposition and return the collapsed vertebrae back to a more normal shape. The balloon may also compact the soft inner portion of cancellous bone in the vertebra to create a cavity. The balloon may then be deflated and removed, and cement (polymethylmethacrylate) may be injected (through the needle) into the cavity to fix the vertebral body and allow for it to maintain a normal shape. The cement may then harden, the needles may be removed, and the incisions may be closed.

In a preferred embodiment hereof, one or more active Jamshidi needles 304 may be used to insert the inflatable bone tamps into the damaged vertebrae and to then inflate them. The active needle 304 may then be used to deflate the tamps, remove them, and inject the cement.

As described earlier, because the procedure takes place in extremely close proximity to the spinal column, the precise placement of the active Jamshidi needle 304 is critical to avoid neurological damage to the patient and to provide for a successful Kyphoplasty procedure.

In a preferred embodiment, imaging instrumentation (e.g., C-arm fluoroscopic imaging instrumentation, CT scan, MRI, etc.) may be used to take sequences of images of the patient's spine from different perspectives. The images may then be used to construct one, two and/or three-dimensional representations of the spine.

In a preferred embodiment hereof, the controller 200 may use the imaging data to model, calculate or otherwise determine the proper step-by-step (optimal) positions, alignments, angles, and trajectories (preferably in three-dimensions) that the needle 304 should take during the procedure. Alternatively, the controller may allow the user to interact with the controller 200 to lay out the proposed step-by-step positions, orientations and trajectories of the needle 304 manually. For example, the controller 200 may display the representations of the patient's spine and the user may draw (or otherwise input) the proposed positions, orientations and trajectories onto the layout that the needle 304 should take.

The surgeon may then use the active Jamshidi needle 304 to perform the procedure, and the controller 200 may overlay the real time orientations and trajectories of the active needle 304 with the modeled orientations and trajectories for each step of the process. In this way, the system 10 may provide step-by-step guidance of the active needle 304 for its precise placement.

For example, as shown in FIG. 25, the controller 200 may display a cross section of the patient's vertebrae taken along the axial plane with the actual axial angle $\alpha_a$ of the active Jamshidi needle 304 (shown as the dashed line) overlaid with the modeled axial angle $\alpha_m$ of the modeled trajectory (the solid line), each taken with respect to the vertical axis (e.g., the plumb line along the mid-sagittal plane). Note however that other reference planes and/or coordinate systems may also be used as a reference.

Using this information, along with the starting point information for the procedure, the surgeon may manipulate the active needle 304 during the insertion procedure such that the instrument's orientation, trajectory and final depth may match that of the modeled data. Note that the display of the controller 200 may dynamically change in real time to provide immediate guidance for each step (and each potential realignment of the needle 304) of the procedure in real time. This may result in a properly placed needle 304 for the insertion of the tamp and cement.

Vertebralplasty is similar to Kyphoplasty but without the insertion and inflation of the bone tamp. Instead, the active Jamshidi needle 304 may be used to inject the bone cement directly into the damaged vertebrae wherein the injection process creates the cavity during the process. However, the insertion of the needle 304 into the damage vertebrae uses the same process and with the same risks, and accordingly, must be performed with high precision. During this process the active needle 304 in communication with the controller 200 provides real time orientation and trajectory information of the needle 304 to the surgeon, allowing for a precise insertion of the needle 304. Once the needle 304 inserted into the vertebrae at the correct location, angle and depth, the bone cement may be injected, and the vertebrae may be successfully repaired.

A person of ordinary skill in the art will understand that the above use case examples are meant for demonstration purposes and that the active Jamshidi needle 304 may be used with a wide variety of procedures that may benefit from its functionalities. It is also understood that the scope of the active Jamshidi needle 304 is not limited in any way by the procedures that the needle 304 may be used to perform.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A Jamshidi needle system that measures angular orientation of the system to aid in implanting one or more pedicle screws during minimally invasive spinal surgery, the system comprising:
    a measurement sensor that is initially separate from the system, that has outer dimensions, and that is combined with the system at or around the time of the minimally invasive spinal surgery;
    a handle including:
        a front portion that includes a longitudinal hole therethrough, and that includes an attachment area with a top end to receive the measurement sensor, wherein the attachment area has inner dimensions which correspond to the measurement sensor outer dimensions, so that when the measurement sensor is received by the attachment area, the measurement sensor is secured in place by the attachment area,
        a back portion that is separable from the front portion, wherein when the back portion is separated from the front portion, the top end provides access to the attachment area to receive the measurement sensor;
        wherein when the front portion and the back portion are attached together, the back portion closes the top end, and the front portion and the back portion form the handle having an outer dimension profile; and
    a cannula that is attached to the front portion at the longitudinal hole, that has a longitudinal axis, and that extends longitudinally from the front portion;
    a stylet or other surgical tool that is attached to the back portion, and that extends through the longitudinal hole and the cannula;
    wherein when the measurement sensor is received and secured in place by the attachment area, the measurement sensor is axially aligned with the axis of the cannula, and the measurement sensor is positioned all or substantially all within the handle outer dimension profile;
    wherein the back portion is removable during the minimally invasive spinal surgery while the measurement sensor remains secured in place by the attachment area, and
    wherein the measurement sensor includes an accelerometer to measure the angular orientation of the axis of the cannula with respect to gravity, and provides an angular orientation signal based at least in part on the measured angular orientation.

2. The Jamshidi needle system of claim 1 wherein the attachment area includes a recess that receives the measurement sensor and secures the measurement sensor in place.

3. The Jamshidi needle system of claim 2 wherein the recess includes a slot that receives the measurement sensor and secures the measurement sensor in place.

4. The Jamshidi needle system of claim 2 wherein the recess includes contoured sides and the measurement sensor includes sides that correspond to the contoured sides of the recess.

5. The Jamshidi needle system of claim 1 wherein the measurement sensor is single-use and disposable.

6. The Jamshidi needle system of claim 1 wherein the attachment area is located on the front portion so that the measurement sensor is located close to the axis of the cannula.

7. The Jamshidi needle system of claim 1 wherein the back portion is removed and replaced with another surgical instrument during the minimally invasive spinal surgery.

8. The Jamshidi needle system of claim 1 wherein the back portion is separated from the front portion, thereby removing the stylet.

9. The Jamshidi needle system of claim 1 wherein the system is a bone marrow biopsy instrument.

10. The Jamshidi needle system of claim 1, wherein the measurement sensor processes the angular orientation signal.

11. The Jamshidi needle system of claim 10 wherein the measurement sensor provides the processed angular orientation signal to a visual display that provides feedback on the angular orientation of the system.

12. The Jamshidi needle system of claim 11, wherein the feedback on the angular orientation of the system is provided when the back portion is removed during the minimally invasive spinal surgery.

13. The Jamshidi needle system of claim 1 wherein the measurement sensor further includes a gyroscope.

14. The Jamshidi needle system of claim 1 wherein the measured angular orientation is an orientation in two-dimensional space or three-dimensional space.

15. The Jamshidi needle system of claim 1, wherein the handle is disposable.

16. The Jamshidi needle system of claim 1, wherein when the back portion is removed during the minimally invasive spinal surgery, the top end is opened for access to the measurement sensor.

17. The Jamshidi needle system of claim 16, wherein the measurement sensor is replaced with a second measurement sensor that is secured in place by the attachment area.

18. The Jamshidi needle system of claim 1, wherein the measurement sensor includes a top surface having a raised area that facilitates insertion of the measurement sensor into the attachment area.

19. A Jamshidi needle system that measures angular orientation of the system to aid in a minimally invasive surgical procedure, comprising:
    an angular measurement assembly that is initially separate from the system, that has outer dimensions and a longitudinal axis, that includes an accelerometer to measure angular orientation with respect to gravity, and that is combined with the system at or around the time of the minimally invasive surgical procedure;

a handle that includes a front portion with a longitudinal hole therethrough, and a back portion that is separable from the front portion;

a cannula that is attached to the front portion at the longitudinal hole, that has a longitudinal axis, and that extends longitudinally from the handle;

a stylet or other surgical tool that is attached to the back portion and that extends through the longitudinal hole and the cannula; and a receptacle that is attached to or formed as part of the front portion, that extends longitudinally along the handle, that includes a top end, and that is configured to receive the angular measurement assembly through the top end when the back portion is separated from the front portion, that has inner dimensions which correspond to the angular measurement assembly outer dimensions, so that when the angular measurement assembly is received by the receptacle, the angular measurement assembly is secured in place by the receptacle, and the longitudinal axis of the angular measurement assembly is aligned with the longitudinal axis of the cannula;

wherein the back portion is removable during the minimally invasive surgical procedure while the angular measurement assembly remains secured in place by the receptacle; and wherein the accelerometer measures the angular orientation of the axis of the cannula with respect to gravity, and the angular measurement assembly provides an angular orientation signal based at least in part on the measured angular orientation.

20. The Jamshidi needle system of claim 19, wherein the receptacle and the angular measurement assembly are configured so that the angular measurement assembly can be received by the receptacle only in a desired manner.

21. The Jamshidi needle system of claim 19, wherein the receptacle secures the angular measurement assembly by at least a portion of the periphery of the angular measurement assembly, and a top surface of the angular measurement assembly is visible when the angular measurement assembly is received by the receptacle.

22. The Jamshidi needle system of claim 21, wherein the top surface of the angular measurement assembly includes a raised area that facilitates insertion of the angular measurement assembly into the receptacle.

23. A Jamshidi needle system for performing a Kyphoplasty or Vertebroplasty procedure, comprising:

an angular measurement assembly that is initially separate from the system, that has outer dimensions and a longitudinal axis, that includes an accelerometer to measure angular orientation with respect to gravity, and that is combined with the system at or around the time of the Kyphoplasty or Vertebroplasty procedure;

a handle that includes a front portion with a longitudinal hole therethrough, and a back portion that is separable from the front portion;

a cannula that is attached to the front portion at the longitudinal hole, that has a longitudinal axis, and that extends longitudinally from the handle;

a stylet or other surgical tool that is attached to the back portion and that extends through the longitudinal hole and the cannula; and a receptacle that is attached to or formed as part of the front portion, that extends longitudinally along the handle, that includes a top end, and that is configured to receive the angular measurement assembly through the top end when the back portion is separated from the front portion, that has inner dimensions which correspond to the angular measurement assembly outer dimensions, so that when the angular measurement assembly is received by the receptacle, the angular measurement assembly is secured in place by the receptacle, and the longitudinal axis of the angular measurement assembly is aligned with the longitudinal axis of the cannula;

wherein the back portion is removable during the Kyphoplasty or Vertebroplasty procedure while the angular measurement assembly remains secured in place by the receptacle; and wherein the accelerometer measures the angular orientation of the axis of the cannula with respect to gravity, and the angular measurement assembly provides an angular orientation signal based at least in part on the measured angular orientation.

24. The Jamshidi needle system of claim 23, wherein the angular measurement assembly processes the angular orientation signal.

25. The Jamshidi needle system of claim 24, wherein the angular measurement assembly provides the processed angular orientation signal to a visual display that provides feedback on the angular orientation of the system.

* * * * *